United States Patent
Laroche et al.

(10) Patent No.: US 9,641,847 B2
(45) Date of Patent: May 2, 2017

(54) METHOD AND DEVICE FOR CLASSIFYING SAMPLES OF AN IMAGE

(71) Applicant: CANON KABUSHIKI KAISHA, Tokyo (JP)

(72) Inventors: Guillaume Laroche, Melesse (FR); Patrice Onno, Rennes (FR); Edouard François, Bourg-des-Comptes (FR); Christophe Gisquet, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 14/245,867

(22) Filed: Apr. 4, 2014

(65) Prior Publication Data
US 2014/0301487 A1 Oct. 9, 2014

(30) Foreign Application Priority Data
Apr. 5, 2013 (GB) .................................. 1306215.3

(51) Int. Cl.
| | |
|---|---|
| *H04N 7/12* | (2006.01) |
| *G09G 5/00* | (2006.01) |
| *H04N 19/14* | (2014.01) |
| *H04N 19/117* | (2014.01) |
| *H04N 19/82* | (2014.01) |

(Continued)

(52) U.S. Cl.
CPC ........... *H04N 19/14* (2014.11); *H04N 19/117* (2014.11); *H04N 19/176* (2014.11); *H04N 19/82* (2014.11); *H04N 19/86* (2014.11); *H04N 19/34* (2014.11)

(58) Field of Classification Search
CPC ..... H04N 19/176; H04N 19/117; H04N 19/34
See application file for complete search history.

(56) References Cited

U.S. PATENT DOCUMENTS

| | | | | |
|---|---|---|---|---|
| 2009/0245660 | A1* | 10/2009 | Henry | ................... G06T 7/0085 |
| | | | | 382/224 |
| 2013/0051454 | A1* | 2/2013 | Sze | ........................ H04N 19/70 |
| | | | | 375/240.02 |

(Continued)

FOREIGN PATENT DOCUMENTS

WO 2013/070147 A1 5/2013

OTHER PUBLICATIONS

Fu, Chih-Ming, et al. "Sample Adaptive Offset in the HVEC Standard." IEEE Transactions on Circuits and Systems for Video Technology. 22.12 (2012): 1755-1764.

(Continued)

*Primary Examiner* — Dave Czekaj
*Assistant Examiner* — Tsion B Owens
(74) *Attorney, Agent, or Firm* — Canon USA, Inc. I.P. Division

(57) ABSTRACT

A method and a device for classifying samples of an image, each sample having a respective sample value the method comprising repartition of each of the samples into a plurality of index classes, wherein the index class allocated to each sample is determined in dependence upon the sample value of the said sample with respect to the sample values of first neighboring samples of said sample according to a given direction and further in respect to the sample values of the first neighboring samples with respect to the sample values of samples neighboring the first neighboring samples according to the said given direction. Processing each sample according to the respective allocated index class.

23 Claims, 19 Drawing Sheets

(51) Int. Cl.
*H04N 19/86* (2014.01)
*H04N 19/176* (2014.01)
*H04N 19/34* (2014.01)

(56) References Cited

U.S. PATENT DOCUMENTS

| | | | | |
|---|---|---|---|---|
| 2013/0114681 A1* | 5/2013 | Zhao | ................... | H04N 19/865 |
| | | | | 375/240.03 |
| 2014/0119433 A1* | 5/2014 | Park | ................ | H04N 19/00127 |
| | | | | 375/240.02 |
| 2014/0376619 A1* | 12/2014 | Tourapis | .............. | H04N 19/117 |
| | | | | 375/240.03 |
| 2015/0358635 A1* | 12/2015 | Xiu | ...................... | H04N 19/159 |
| | | | | 375/240.16 |

OTHER PUBLICATIONS

Sullivan, Gary J., et al. "Overview of the High Efficiency video coding (HEVC) standard." IEEE Transactions on Circuits and Systems for Video Technology. 22.12 (2012): 1649-1668.

* cited by examiner

| Edge Index | Conditions | Signal type | Offset |
|---|---|---|---|
| 0 | c<2 neighboring pixels |  | $+O_1$ |
| 1 | c<1 neighbor and c==1 neighbor |  | $+O_2$ |
| 3 | c>1 neighbor and c==1 neighbor |  | $-O_3$ |
| 4 | c>2 neighboring pixels |  | $-O_4$ |
| 2 | None of the above | | |

SAO parameter representation for the LCU mode

Figure 16

METHOD AND DEVICE FOR CLASSIFYING SAMPLES OF AN IMAGE

This application claims the benefit under 35 U.S.C. §119 (a)-(d) of United Kingdom Patent Application No. 1306215.3, filed on Apr. 5, 2013 and entitled "METHOD AND DEVICE FOR CLASSIFYING SAMPLES OF AN IMAGE". The above cited patent application is incorporated herein by reference in its entirety.

FIELD

The present subject matter relates to a method and device for classifying samples of an image. Particularly, but not exclusively, the claimed subject matter relates to a method and device for providing compensation offsets for a set of reconstructed pixels of an image. The subject matter herein further concerns a method and device for encoding or decoding a sequence of digital images.

BACKGROUND

Video data is typically composed of a series of still images which are shown rapidly in succession as a video sequence to give the idea of a moving image. Video applications are continuously moving towards higher and higher resolution. A large quantity of video material is distributed in digital form over broadcast channels, digital networks and packaged media, with a continuous evolution towards higher quality and resolution (e.g. higher number of pixels per frame, higher frame rate, higher bit-depth or extended colour gamut). This technological evolution puts higher pressure on the distribution networks that are already facing difficulties in bringing HDTV resolution and high data rates economically to the end user.

Video coding techniques typically use spatial and temporal redundancies of images in order to generate data bit streams of reduced size compared with the video sequences. Spatial prediction techniques (also referred to as Intra coding) exploit the mutual correlation between neighbouring image pixels, while temporal prediction techniques (also referred to as INTER coding) exploit the correlation between images of sequential images. Such compression techniques render the transmission and/or storage of the video sequences more effective since they reduce the capacity required of a transfer network, or storage device, to transmit or store the bit-stream code.

An original video sequence to be encoded or decoded generally comprises a succession of digital images which may be represented by one or more matrices the coefficients of which represent pixels. An encoding device is used to code the video images, with an associated decoding device being available to reconstruct the bit stream for display and viewing.

Common standardized approaches have been adopted for the format and method of the coding process. One of the more recent standards is HEVC, in which a video image is partitioned into smaller portions of pixels known as Coding Units (sometimes referred to as macroblocks or blocks of pixels). The coding units can be partitioned and adjusted according to the characteristics of the original image segment under consideration. This allows more detailed coding of areas of the video image which contain relatively more information and less coding effort for those areas with fewer features.

Scalable Video Coding (SVC) is another standardized approach in which a video image is split into image portions (often referred to as macroblocks or blocks of pixels) and is treated as being comprised of hierarchical layers. The hierarchical layers include a base layer, corresponding to lower quality images (or frames) of the original video sequence, and one or more enhancement layers (also known as refinement layers) providing better quality, spatial and/or temporal enhancement images compared to base layer images.

Both encoding and decoding processes involve a decoding process of an encoded image. This process is typically performed at the encoder side for the purpose of future motion estimation which enables an encoder and a corresponding decoder to have the same reference frames.

A filtering process may be applied to the encoded image to improve the visual quality of the image as well as the motion compensation of subsequent frames. In the current HEVC standard, loop filters which are employed include: a deblocking filter and a sample adaptive offset (SAO).

SAO filtering enables correction of the pixels of a class of pixels by adding the same integer value to each pixel of the class. In the current SAO applied in HEVC, pixel classification is determined according to the type of SAO: Edge Offset type or Band Offset type. In addition, the Edge Offset class enables the edges form of a SAO partition to be identified according to a given direction. The Band Offset splits the range of pixel values into bands of pixel. Each band contains four classes. The encoder selects the best integer offset value for each class. The offset values are then inserted in the bitstream for each SAO partition.

Improved forms of classification are required to improve the efficiency and quality of encoding and decoding process.

SUMMARY

The present subject matter has been devised to address one or more of the foregoing concerns.

According to a first aspect of the subject matter there is provided a method of processing samples of an image, each sample having a respective sample value, the method comprising:

repartition of each of the samples into a plurality of index classes, wherein the index class allocated to each sample is determined in dependence upon the sample value of the said sample with respect to the sample values of first neighbouring samples of said sample according to a given direction and further in respect to the sample values of the first neighbouring samples with respect to the sample values of samples neighbouring the first neighbouring samples according to the said given direction; and processing each sample according to the respective allocated index class.

In the context of the present subject matter a sample may correspond to a single pixel of an image, with a sample value corresponding to the respective pixel value. Alternatively a sample may comprise a plurality of pixels, and the sample value may correspond to a pixel value determined from the pixel values of the plurality of pixels. Moreover, a sample may correspond to one of the colour components constituting a pixel.

In embodiments of the subject matter coding efficiency may be improved in HEVC codec or scalable codec. In particular embodiments in which SAO is implemented in inter layer predictions an improvement in efficiency may be provided.

In one embodiment, the index class allocated to a sample is determined in dependence upon a value representative of the third derivative of the image signal at the position of the said sample.

In another embodiment, the index class allocated to a sample is determined in dependence upon the sign of a value representative of the derivative of the second derivative of the image signal at the position of the said sample.

In a further embodiment, the index class CL allocated to each sample is determined based on the following equation:

$$\text{sign}[((2c-c_n1-c_n2+2)/4)-((2c_n2-c-c_n4+2)/4)]-\text{sign}[((2c_n1-c_n3-c+2)/4)-((2c-c_n1-c_n2+2)/4)]+2$$

where:

c is the sample value of the said sample $c_n1$ is the sample value of a first sample neighbouring the said sample according to the given direction $c_n2$ is the sample value of a second sample neighbouring the said sample according to the given direction $c_n3$ is the sample value of a third sample neighbouring the first sample according to the given direction $c_n4$ is the sample value of a fourth sample neighbouring the second sample according to the given direction sign[.] is a function defined as sign[x]=1, when x>0 sign[x]=−1, when x<0 sign[x]=0, when x=0

In yet another embodiment the value representative of the second derivative is obtained by an operation on samples corresponding to high pass filtering. In an embodiment the value representative of the third derivative is obtained by an operation on samples corresponding to high pass filtering.

In still another embodiment, the second derivative is obtained by performing a convolution product of the matrix of the current sample and its neighbouring samples with a predetermined matrix.

In another embodiment, the predetermined matrix is 0 0 0
−1 2 −1
0 0 0

In another embodiment, the predetermined matrix is

0 −1 0
−1 4 −1
0 −1 0

In yet another embodiment, the predetermined matrix is

−1 −1 −1
−1 8 −1
−1 −1 −1

In another example embodiment, the index class CL allocated to each sample is determined based on the following equation:

$$\text{sign}[((4c-c_n1-c_n2-c'-c''+4)/8)-((4c_n2-c-c_n4-c'_n2-c''_n2+4)/8)]-\text{sign}[((4c_n1-c_n3-c-c'_n1-c''_n1+4)/8)-((4c-c_n1-c_n2-c'-c''+4)/8)]+2$$

where:

c is the sample value of the said sample $c_n1$ is the sample value of a first sample neighbouring the said sample according to the given direction $c_n2$ is the sample value of a second sample neighbouring the said sample according to the given direction $c_n3$ is the sample value of a third sample neighbouring the first sample according to the given direction $c_n4$ is the sample value of a fourth sample neighbouring the second sample according to the given direction c' is the sample value of a fifth sample neighboring the said sample according to a direction perpendicular to the given direction c" is the sample value of a sixth sample neighboring the said sample according to a direction perpendicular to the given direction $c'_n1$ is the sample value of a seventh sample neighboring the first neighbouring sample of the said sample according to a direction perpendicular to the given direction $c''_n1$ is the sample value of an eighth sample neighboring the first neighbouring sample of the said sample according to a direction perpendicular to the given direction $c'_n2$ is the sample value of a ninth sample neighboring the second neighbouring sample of the said sample according to a direction perpendicular to the given direction $c''_n2$ is the sample value of a tenth sample neighboring the second neighbouring sample of the said sample according to a direction perpendicular to the given direction In another example embodiment, the index class CL allocated to each sample is determined based on the following equation:

$$\text{sign}[((8c-c_n1-c'_n1-c''_n1-c_n2-c'_n2-c''_n2-c'-c''+8)/16)-((8c_n2-c-c'-c''-c_n4-c'_n4-c''_n4-c'_n2-c''_n2+8)/16)]-\text{sign}[((8c_n1-c_n3-c'_n3-c''_n3-c-c'c''-c'_n1-c''_n1+8)/16)-((4c-c_n1-c'_n1-c''_n1-c_n2-c'_n2-c''_n2-c'-c''+8)/16)]+2$$

where:

c is the sample value of the said sample $c_n1$ is the sample value of a first sample neighbouring the said sample according to the given direction $c_n2$ is the sample value of a second sample neighbouring the said sample according to the given direction $c_n3$ is the sample value of a third sample neighbouring the first sample according to the given direction $c_n4$ is the sample value of a fourth sample neighbouring the second sample according to the given direction c' is the sample value of a fifth sample neighboring the said sample according to a direction perpendicular to the given direction c" is the sample value of a sixth sample neighboring the said sample according to a direction perpendicular to the given direction $c'_n1$ is the sample value of a seventh sample neighboring the first neighbouring sample of the said sample according to a direction perpendicular to the given direction $c''_n1$ is the sample value of an eighth sample neighboring the first neighbouring sample of the said sample according to a direction perpendicular to the given direction $c'_n2$ is the sample value of a ninth sample neighboring the second neighbouring sample of the said sample according to a direction perpendicular to the given direction $c''_n2$ is the sample value of a tenth sample neighboring the second neighbouring sample of the said sample according to a direction perpendicular to the given direction $c'_n3$ is the sample value of an eleventh sample neighboring the third neighbouring sample of the said sample according to a direction perpendicular to the given direction $c''_n3$ is the sample value of a twelfth sample neighboring the third neighbouring sample of the said sample according to a direction perpendicular to the given direction $c'_n4$ is the sample value of a thirteenth sample neighboring the fourth neighbouring sample of the said sample according to a direction perpendicular to the given direction $c''_n4$ is the sample value of a fourteenth sample neighboring the fourth neighbouring sample of the said sample according to a direction perpendicular to the given direction In one example embodiment, processing each sample according to the respective allocated index class comprises associating, with each determined index class, a respective compensation offset for application to the respective sample value of each sample of the said index class.

Thus, a second aspect of the subject matter provides a method of providing compensation offsets for a set of reconstructed samples of an image, each sample having a respective sample value, the method comprising:

classifying the reconstructed samples into a plurality of index classes in accordance with the method of any of the embodiments of the first aspect of the subject matter, and associating, with each determined index class, a respective compensation offset for application to the respective sample value of each sample of the said index class.

In another example embodiment, processing each sample according to the respective allocated index class further comprises:

applying compensation offsets to the sample values of the samples, each compensation offset being associated with a respective index class of samples; and generating a bitstream of encoded samples.

Thus, a third aspect of the subject matter provides a method encoding an image composed of a plurality of samples, the method comprising:

classifying the samples into a plurality of index classes in accordance with the method of any embodiment of the first aspect of the subject matter applying compensation offsets to the sample values of the samples, each compensation offset being associated with a respective index class of samples; and generating a bitstream of encoded samples.

In another example embodiment the method comprises:

performing initial encoding of the samples;

decoding the encoded samples to provide reconstructed samples; and performing loop filtering on the reconstructed samples wherein loop filtering comprises of applying compensation offsets.

In another example embodiment, image data comprises a plurality of layers including a base layer and an enhancement layer, the method comprising:

up sampling the base layer of the image data, wherein the compensation offsets are applied to samples of the up sampled base layer.

In another example embodiment, applying compensation offsets may be performed on the same sample more than once.

In another example embodiment, encoded data representative of the respective compensation offsets for each index class is transmitted in the bitstream, In another example embodiment, encoded classification data defining a selected classification direction is transmitted in the bitstream.

A fourth aspect of the subject matter provides a method of decoding an image composed of a plurality of samples, the method comprising:

classifying the samples into a plurality of index classes in accordance with the method of any embodiment of the first aspect of the subject matter applying compensation offsets to the sample values of the samples, each compensation offset being associated with a respective index class of sample.

In another example embodiment, the method comprises:

receiving encoded samples;

decoding the encoded samples to provide reconstructed samples;

performing loop filtering on the reconstructed samples wherein the loop filtering comprises applying compensation offsets.

In another example embodiment, image data comprises a plurality of layers including a base layer and an enhancement layer, the method comprising:

up sampling the base layer of the image data, wherein the compensation offsets are applied to samples of the up sampled base layer.

In another example embodiment, applying compensation offsets may be performed on the same sample more than once.

A fifth aspect of the subject matter provides a method of decoding an image composed of a plurality of sample values, the method comprising:

receiving encoded sample values;

receiving encoded classification data defining a selected classification direction associated with respective compensation offsets provided according to the method of claim 12, each compensation offset corresponding to an index class of samples;

decoding the encoded samples to provide reconstructed samples and decoding the encoded compensation offsets; and performing loop filtering on the reconstructed samples, the loop filtering comprising applying the received compensation offsets to the image samples of the respective samples, according to index class of the sample.

A sixth aspect of the subject matter provides a signal carrying an information dataset for an image represented by a video bitstream, the image comprising a set of reconstructable samples, each reconstructable sample after reconstruction having a respective sample value; the information dataset comprising: classification data representative of a plurality of index classes associated with respective compensation offsets, each compensation offset being applicable to the sample values of reconstructed samples attributed to the associated index class, wherein the samples are classified into the plurality of index classes in accordance with the method of any one of claims 1 to 11.

A seventh aspect of the subject matter provides a device for processing samples of an image, each sample having a respective sample value the device comprising:

a repartition module for dividing the samples into a plurality of index classes, wherein the index class allocated to each sample is determined in dependence upon the sample value of the said sample with respect to the sample values of first neighbouring samples of said sample according to a given direction and further in respect to the sample values of the first neighbouring samples with respect to the sample values of samples neighbouring the first neighbouring samples according to the said given direction; and a processor for processing each sample according to the respective allocated index class.

In an example embodiment, the repartition module is configured to allocate an index class to a sample in dependence upon a value representative of the third derivative of the image signal at the position of the said sample.

In another example embodiment, the repartition module is configured to allocate an index class to a sample in dependence upon the sign of a value representative of the derivative of the second derivative of the image signal at the position of the respective sample.

In another example embodiment, the repartition module is configured to allocate an index class CL to a sample based on the following equation:

$$\text{sign}[((2c-c_n1-c_n2+2)/4)-((2c_n2-c-c_n4+2)/4)]-\text{sign}[((2c_n1-c_n3-c+2)/4)-((2c-c_n1-c_n2+2)/4)]+2$$

where:

c is the sample value of the said sample $c_n1$ is the sample value of a first sample neighbouring the said sample according to the given direction $c_n2$ is the sample value of a second sample neighbouring the said sample according to the given direction $c_n3$ is the sample value of a third sample neighbouring the first sample according to the given direction $c_n4$ is the sample value of a fourth sample neighbouring the second sample according to the given direction In an embodiment, the second derivative is obtained by performing a convolution product of the matrix of the current sample and its neighbouring samples with a predetermined matrix.

In an example embodiment, the predetermined matrix is 0 0 0
−1 2 −1
0 0 0

In another example embodiment, the predetermined matrix is

0 −1 0
−1 4 −1
0 −1 0

In another example embodiment, the predetermined matrix is

−1 −1 −1
−1 8 −1
−1 −1 −1

In an example embodiment, the index class CL allocated to each sample is determined based on the following equation:

$$\text{sign}[((4c-c_n1-c_n2-c'-c''+4)/8)-((4c_n2-c-c_n4-c'_n2-c''_n2+4)/8)]-\text{sign}[((4c_n1-c_n3-c-c'_n1-c''_n1+4)/8)-((4c-c_n1-c_n2-c'-c''+4)/8)]+2$$

where:

c is the sample value of the said sample $c_n1$ is the sample value of a first sample neighbouring the said sample according to the given direction $c_n2$ is the sample value of a second sample neighbouring the said sample according to the given direction $c_n3$ is the sample value of a third sample neighbouring the first sample according to the given direction $c_n4$ is the sample value of a fourth sample neighbouring the second sample according to the given direction c' is the sample value of a fifth sample neighboring the said sample according to a direction perpendicular to the given direction c'' is the sample value of a sixth sample neighboring the said sample according to a direction perpendicular to the given direction $c'_n1$ is the sample value of a seventh sample neighboring the first neighbouring sample of the said sample according to a direction perpendicular to the given direction $c''_n1$ is the sample value of an eighth sample neighboring the first neighbouring sample of the said sample according to a direction perpendicular to the given direction $c'_n2$ is the sample value of a ninth sample neighboring the second neighbouring sample of the said sample according to a direction perpendicular to the given direction $c''_n2$ is the sample value of a tenth sample neighboring the second neighbouring sample of the said sample according to a direction perpendicular to the given direction In an example embodiment, the index class CL allocated to each sample is determined based on the following equation:

$$\text{sign}[((8c-c_n1-c'_n1-c''_n1-c_n2-c'_n2-c''_n2-c'-c''+8)/16)-((8c_n2-c-c'-c''-c_n4-c'_n4-c''_n4-c'_n2-c''_n2+8)/16)]-\text{sign}[((8c_n1-c_n3-c'_n3-c''_n3-c-c'-c''-c'_n1-c''_n1+8)/16)-((4c-c_n1-c'_n1-c''_n1-c_n2-c'_n2-c''_n2-c'-c''+8)/16)]+2$$

where:

c is the sample value of the said sample $c_n1$ is the sample value of a first sample neighbouring the said sample according to the given direction $c_n2$ is the sample value of a second sample neighbouring the said sample according to the given direction $c_n3$ is the sample value of a third sample neighbouring the first sample according to the given direction $c_n4$ is the sample value of a fourth sample neighbouring the second sample according to the given direction c' is the sample value of a fifth sample neighboring the said sample according to a direction perpendicular to the given direction c'' is the sample value of a sixth sample neighboring the said sample according to a direction perpendicular to the given direction $c'_n1$ is the sample value of a seventh sample neighboring the first neighbouring sample of the said sample according to a direction perpendicular to the given direction $c''_n1$ is the sample value of an eighth sample neighboring the first neighbouring sample of the said sample according to a direction perpendicular to the given direction $c'_n2$ is the sample value of a ninth sample neighboring the second neighbouring sample of the said sample according to a direction perpendicular to the given direction $c''_n2$ is the sample value of a tenth sample neighboring the second neighbouring sample of the said sample according to a direction perpendicular to the given direction $c'_n3$ is the sample value of an eleventh sample neighboring the third neighbouring sample of the said sample according to a direction perpendicular to the given direction $c''_n3$ is the sample value of a twelfth sample neighboring the third neighbouring sample of the said sample according to a direction perpendicular to the given direction $c'_n4$ is the sample value of a thirteenth sample neighboring the fourth neighbouring sample of the said sample according to a direction perpendicular to the given direction $c''_n4$ is the sample value of a fourteenth sample neighboring the fourth neighbouring sample of the said sample according to a direction perpendicular to the given direction In an example embodiment, the processor of the processing device for processing each sample according to the respective allocated index class is configured to associate, with each determined index class, a respective compensation offset for application to the respective sample value of each sample of the said index class.

Thus, a further aspect of the subject matter provides a device for providing compensation offsets for a set of reconstructed samples of an image, each sample having a respective sample value, the device comprising:

a classification module for classifying the reconstructed samples into a plurality of index classes in accordance with the device of any one of the preceding claims, and associating, with each determined index class, a respective compensation offset for application to the respective sample value of each sample of the said index class.

In another example embodiment, the processor for processing each sample according to the respective allocated index class further comprises:

a compensation offset module for applying compensation offsets to the sample values of the samples, each compensation offset being associated with a respective index class of samples; and an encoder for generating a bitstream of encoded samples.

Thus, a yet further aspect of the subject matter provides an encoding device for encoding an image composed of a plurality of samples, the device comprising:

a device for classifying the samples into a plurality of index classes in accordance with the device of any embodiment of the seventh aspect of the subject matter;

a compensation offset module for applying compensation offsets to the sample values of the samples, each compensation offset being associated with a respective index class of samples; and an encoder for generating a bitstream of encoded samples.

In another embodiment the device is configured to encode the samples;

decode the encoded samples to provide reconstructed samples; and perform loop filtering on the reconstructed samples wherein the loop filtering comprises applying compensation offsets.

In an example embodiment, image data comprises a plurality of layers including a base layer and an enhancement layer, the device comprising:

an upsampler for upsampling the base layer of the image data, wherein the compensation offsets are applied to samples of the upsampled base layer.

In another example embodiment, application of compensation offsets may be performed on the same sample more than once.

In an example embodiment, a transceiver is provided for transmitting, in the bitstream, encoded data representative of the respective compensation offsets for each index class.

In another example embodiment, the device configured to encode classification data defining a selected classification direction and to transmit the encoded classification data in the bitstream.

Another aspect of the subject matter provides a device for decoding an image composed of a plurality of samples, the device comprising:

a device for classifying the samples into a plurality of index classes in accordance with the device of any one of the previous embodiments; and a compensation offset module for applying compensation offsets to the sample values of the samples, each compensation offset being associated with a respective index class of samples.

In an example embodiment the device is configured to:

receive encoded samples;

decode the encoded samples to provide reconstructed samples; and perform loop filtering on the reconstructed samples wherein the loop filtering comprises applying compensation offsets.

In another example embodiment, image data comprises a plurality of layers including a base layer and an enhancement layer, the device comprising:

an upsampler for upsampling the base layer of the image data, wherein the compensation offsets are applied to samples of the upsampled base layer.

In an example embodiment, application of compensation offsets may be performed on the same sample more than once.

Another aspect of the subject matter provides a device of decoding an image composed of a plurality of sample values, the device comprising:

a receiver for receiving encoded sample values and encoded classification data defining a selected classification direction associated with respective compensation offsets provided according to the device of a previous embodiment, each compensation offset corresponding to an index class of samples;

a decoder for decoding the encoded samples to provide reconstructed samples and decoding the encoded compensation offsets; and a loop filter for performing loop filtering on the reconstructed samples, the loop filtering comprising applying the received compensation offsets to the image samples of the respective samples, according to the index class of the sample.

In an example embodiment the second derivative is obtained by means of a high-pass filter.

In another example embodiment a high pass filter is provided for obtaining the second derivative.

At least parts of the methods according to the subject matter herein may be computer implemented. Accordingly, the present subject matter may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present subject matter may take the form of a computer program product embodied in any tangible medium of expression having computer usable program code embodied in the medium.

Since the present subject matter can be implemented in software, the present subject matter can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the subject matter will now be described, by way of example only, and with reference to the following drawings in which:

FIG. 16 illustrates examples of 3 matrixes enabling computing of a second derivative on a 2D signal;

DETAILED DESCRIPTION

Figure 1:
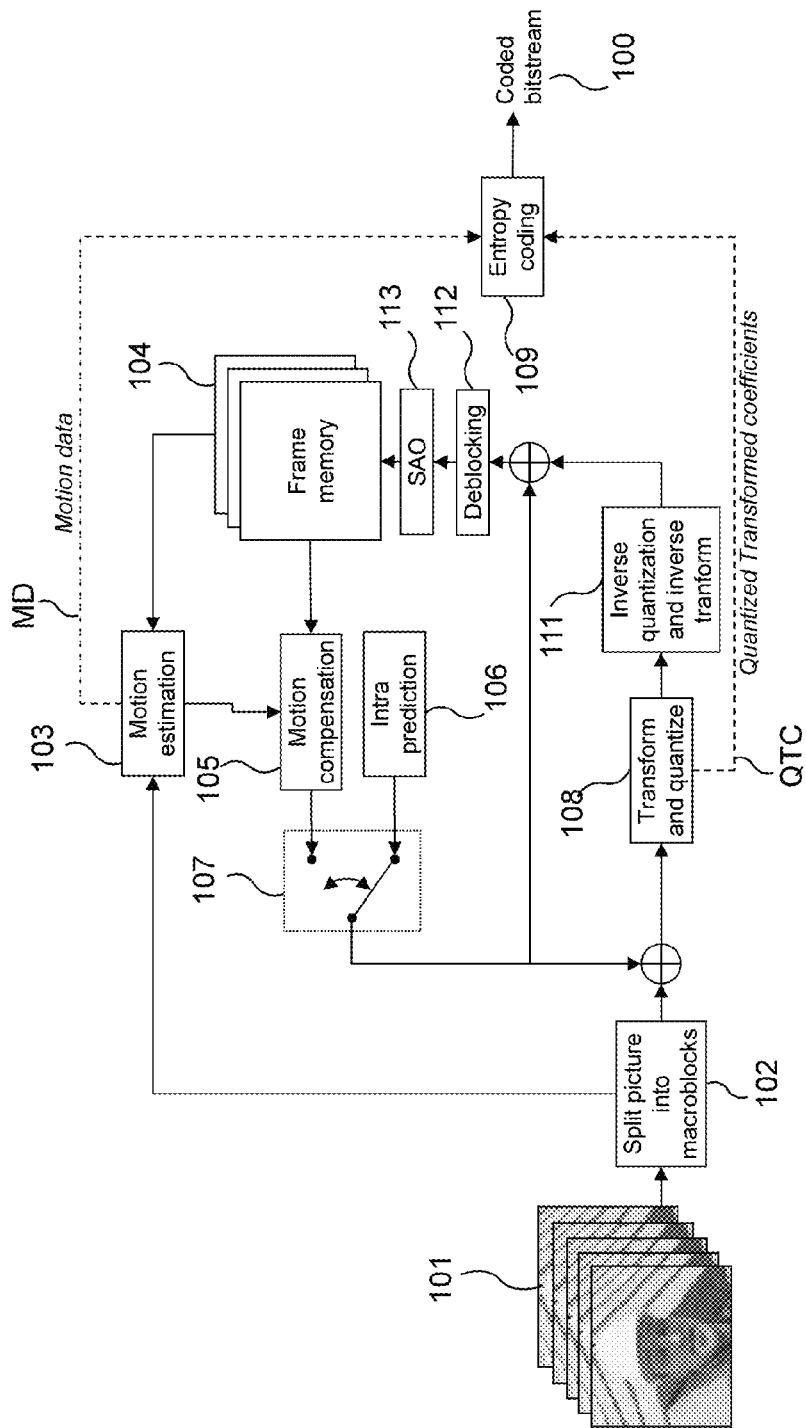
FIG. 1 schematically illustrates the architecture of a video encoder in which one or more embodiments may be implemented.

FIG. 1 illustrates a block diagram of video encoding device of a generic type conforming to a HEVC video compression system. The HEVC encoder is represented by connected modules, each module being adapted to implement, for example in the form of programming instructions to be executed by the CPU 1811 of device 1800 represented in FIG. 18, at least one corresponding aspect of a method implementing at least one embodiment of encoding an image of a sequence of images according to one or more embodiments.

An original sequence of digital images 101 to be compressed is received as an input by the encoder. Each digital image is represented by a set of samples, known as pixels.

A coded bitstream 100 is output by the encoder after implementation of the encoding process. The encoder successively performs the aspects described below to provide the coded bitstream. The bitstream 100 comprises a plurality of encoding units or slices, each slice comprising a slice header for transmitting encoding values of encoding parameters used to encode the slice and a slice body, comprising encoded video data.

A first picture or frame to be encoded (compressed) is divided into blocks of pixels referred to as coding units (CU) in the HEVC standard. The first picture is thus split into blocks or macroblocks 102. Each block first undergoes a motion estimation operation 103, which comprises a search, among the reference pictures stored in a dedicated memory buffer 104, for reference blocks that would provide a good prediction of the block. This motion estimation provides one or more reference picture indexes which contain the found reference blocks, as well as the corresponding motion vectors. A motion compensation 105 then applies the estimated motion vectors on the found reference blocks and computes a temporal residual. An Intra prediction 106 determines the spatial prediction mode that would provide the best performance to predict the current block and encode it in INTRA mode. An INTRA prediction residual is computed. Note that the residual corresponds to the difference between the block to be predicted and its block predictor (spatial or temporal);

Next, a coding mode selection mechanism 107 selects a coding mode, from among the spatial and temporal predictions, which provides the best rate distortion trade-off in the coding of the current block. The residual corresponding to the selected coding mode then undergoes a transform (DCT) and a quantization 108 to obtain a compression effect. Entropy coding 109 of the so-quantized coefficients QTC (and associated motion data MD) is performed. The compressed texture data 100 associated with the coded current block 102 is sent for output.

The current block is then reconstructed by inverse quantization (also called scaling) and inverse transform 111. This is followed (if required) by a sum of the inverse transformed residual and the prediction block of the current block in order to form the reconstructed block. The reconstructed blocks are then post-filtered and stored in a buffer called the decoded picture buffer (DPB) in order to form the reconstructed frame for use as a reference picture for the prediction of any subsequent pictures to be encoded. The current HEVC standard includes 2 post filtering processes, the deblocking filter 112 followed by the sample adaptive offset (SAO) (113). It may be noted that the loop filtering can be applied block by block or LCU by LCU in the HEVC standard. The post filtered pixels of LCU are not used as reference pixels for Intra prediction.

Finally, a last entropy coding is given the coding mode; the motion data in case of inter block, and the prediction direction in case of intra prediction, as well as the quantized DCT coefficients previously calculated. This entropy coder encodes each of these data into their binary form and encapsulates the so-encoded block into a container referred to as a NAL unit (Network Abstract Layer). A NAL unit contains all encoded coding units from a given slice. A coded HEVC bit-stream is composed of a series of NAL units.

Figure 2:
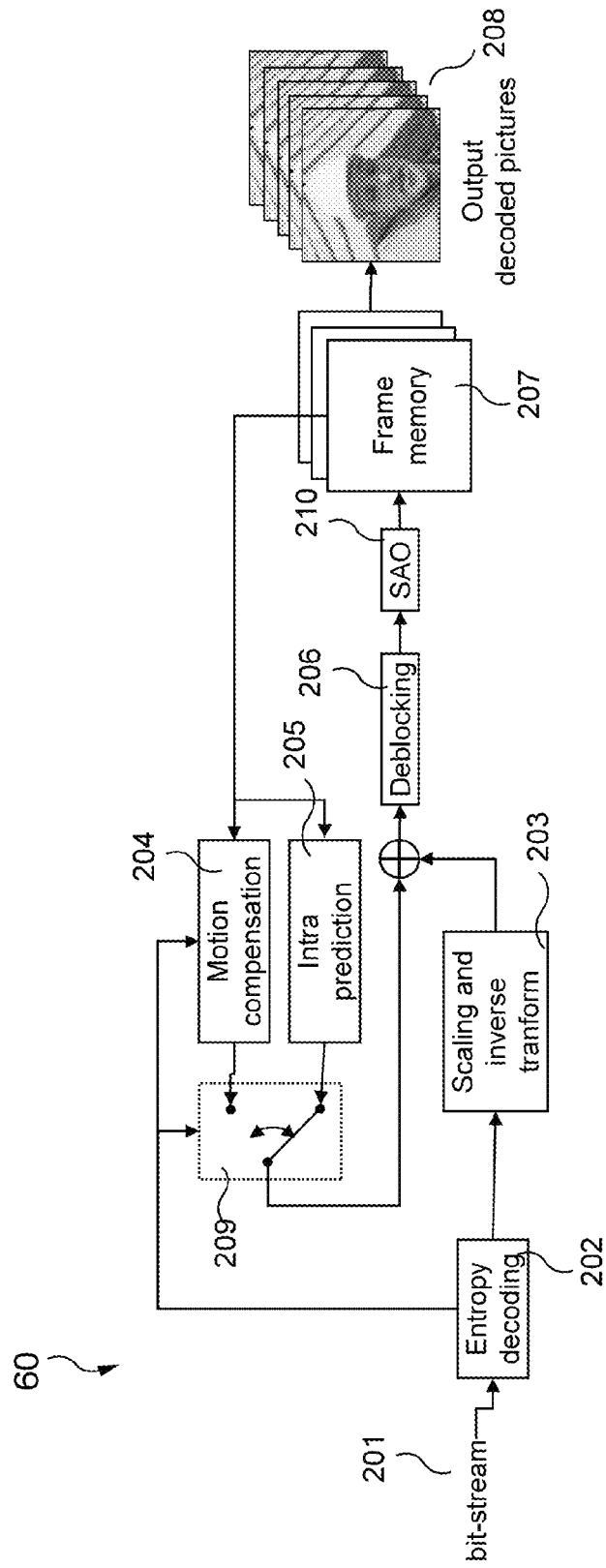
FIG. 2 illustrates the architecture of a video decoder in which one or more embodiments may be implemented.

FIG. 2 is a block diagram of a standard HEVC decoding system in which one or more embodiments may be implemented. This decoding process of a bit-stream 201 starts by the entropy decoding 202 of each block (array of pixels) of each coded picture in the bit-stream. This entropy decoding 202 provides the coding mode, the motion data (reference picture indexes, motion vectors of INTER coded blocks), the intra prediction directions, residual data and SAO filter parameters. The residual data comprises quantized and transformed DCT coefficients. Next, these quantized DCT coefficients undergo inverse quantization (scaling) and inverse transform operations 203.

The decoded residual is then added to the temporal (Inter) 204 or spatial (Intra) 205 prediction block of the current block, to provide the reconstructed block. The prediction mode information which is provided by the entropy decoding mode extracted from the bitstream indicates if the current block is Intra or Inter 209.

The reconstructed block finally undergoes one or more in-loop post-filtering processes, e.g. deblocking 206 and SAO 210, which aim at reducing the blocking artifact inherent to any block-based video codec (deblocking), and improve the quality of the decoded picture.

The full post-filtered picture is then stored in the Decoded Picture Buffer (DPB), represented by the frame memory 207, which stores pictures that will serve as references to predict future pictures to decode. The decoded pictures 208 are also ready to be displayed on screen.

The aim of Sample Adaptive Offset (SAO) filtering is to improve the quality of the reconstructed frame by sending additional data in the bitstream in contrast to the deblocking filter tool where no information is transmitted.

Figure 3A:
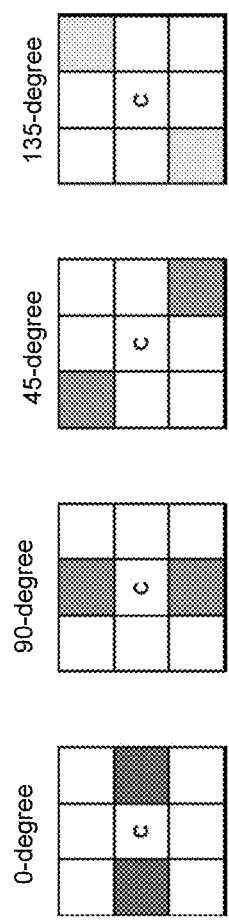
FIGS. 3A and 3B illustrate examples of sample adaptive Edge offset classification in HEVC.

In a SAO, each pixel is classified into a predetermined class and the same offset value is added to every pixel sample of the same class. One offset is encoded in the bitstream for each class. SAO loop filtering has 2 types of classification for the Largest Coding unit (LCU) representing a squared area of the frame: Edge Offset and Band Offset. An example of Edge Offset is schematically illustrated in FIG. 3, and an example of Band Offset is schematically illustrated in FIG. 4.

The SAO tool can be applied LCU by LCU of a quad-tree structure. In this case the parameters are selected for each LCU at the encoder side and parameters are decoded and/or derived for each LCU at the decoder side. This offers the possibility of easily encoding and decoding low delay configurations. Moreover, when SAO filtering is enabled, only one SAO classification is used: either the Edge Offset tool or the Band Offset according to the related parameters transmitted in the bitstream for each classification. These parameters can be copied from the upper and left LCU, for example, instead of transmitting all the SAO data.

Edge Offset involves determining a class for each pixel by comparing its value to the values of 2 neighboring pixels. Moreover, these two neighboring pixels depend on a parameter which indicates the direction of these 2 neighboring pixels with respect to the current pixel. These directions are the O-degree (horizontal direction), 45-degree (diagonal direction), 90-degree (vertical direction) and 135-degree (second diagonal direction). These 4 directions are schematically illustrated in FIG. 3A.

Figure 3B:
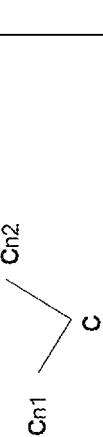
Figure 3B:
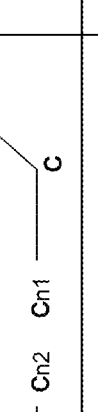
Figure 3B:
Figure 3B:
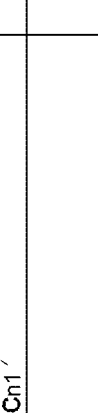
Figure 4:
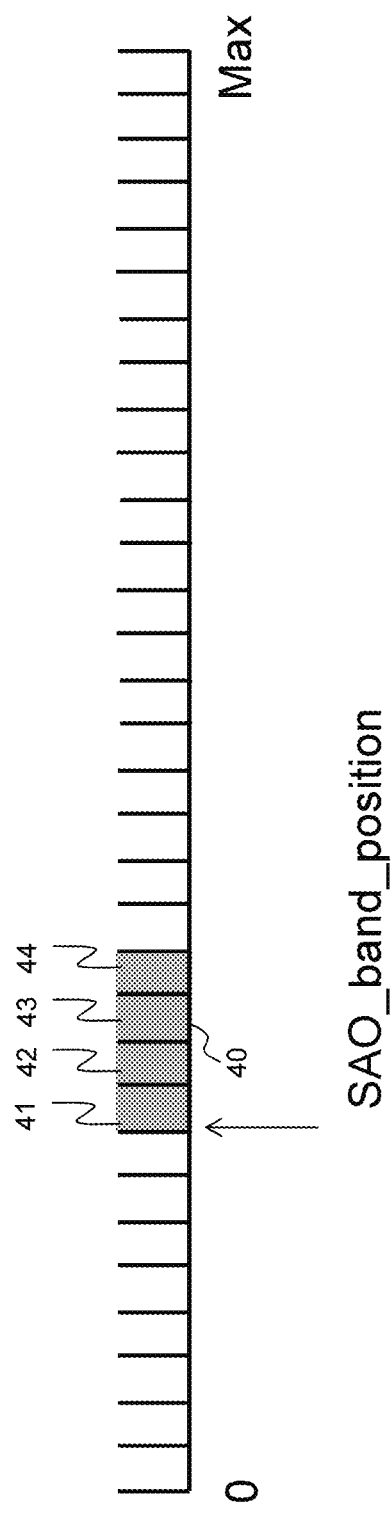
FIG. 4 illustrates an example of the sample adaptive band offset classification of HEVC.

The table of FIG. 3B gives the offset value to be applied to the pixel value of a particular pixel "c" according to the value of the neighboring pixels at the decoder side.

When the value of C is less than the two values of neighbouring pixels Cn1 and Cn2, the offset to be added to the pixel value of the pixel C is "+O1". When the pixel value of C is less than one pixel value of its neighbouring pixels (either Cn1 or Cn2) and C is equal to one value of its neighbors, the offset to be added to this pixel sample value is "+O2".

When the pixel value of c is less than one of the pixel values of its neighbors (Cn1 or Cn2) and the pixel value of C is equal to one value of its neighbors, the offset to be applied to this pixel sample is "−O3". When the value of C is greater than the two values of Cn1 or Cn2, the offset to be applied to this pixel sample is "−O4".

When none of the above conditions is met on the current sample and its neighbors, no offset value is added to the current pixel C as depicted by the Edge Index classification "2" of the table.

It is important to note that for the particular case of the Edge Offset mode, the absolute value of each offset (O1, O2, O3, O4) is encoded in the bitstream. The sign to be applied to each offset depends on the edge index (or the Edge Index in the HEVC specifications) to which the current pixel belongs. According to the table represented in FIG. 3, for Edge Index 0 and for Edge Index 1 (O1, O2) a positive offset is applied. For Edge Index 3 and Edge Index 4 (O3, O4), a negative offset is applied to the current pixel.

In the most recent version of the HEVC specifications, the direction for the Edge Offset is specified in the bitstream by sao_eo_class_luma for the luma component and sao_eo_class_chroma for both chroma components U and V.

The SAO Edge Index corresponding to the index classification where the class for the current pixel is obtained by the following formula:

$$\text{EdgeIndex} = \text{sign}(c - cn2) - \text{sign}(cn1 - c) + 2$$

where the definition of the function sign(.) is given by the following relationships
sign(x)=1, when x>0
sign(x)=−1, when x<0
sign(x)=0, when x=0

In order to simplify the Edge Offset determination for each pixel, the difference between the pixel value of C and the pixel value of both its neighboring pixels can be shared for current pixel C and its neighbors. Indeed, when SAO Edge Offset filtering is applied using a raster scan order of pixels of the current LCU or frame, the term sign ($c_n$1−c) has already computed for the previous pixels. As a consequence this sign ($c_n$1−c) does not need to be computed again.

Band Offset Classification in SAO also depends on the pixel value of the sample to be processed. A class in SAO Band offset is defined as a range of pixel values. For all pixels within a range the same offset is added to the pixel value. In the current HEVC specifications (HM6.0) the number of offsets for the Band Offset tool is 4 as schematically illustrated in FIG. 4.

One implementation of SAO Band offset splits the range of pixel values into 32 ranges of the same size. These 32 ranges are the classes of SAO Band offset. The minimum value of the range of pixel values is systematically 0 and the maximum value depends on the bit depth of the pixel values according to the following relationship Max=$2^{Bitdepth}-1$. Classifying the pixels into 32 ranges of the full interval includes 5 bit checking needed to classify the pixels values for fast implementation i.e. only the 5 first bits (5 most significant bits) are checked to classify a pixel into one of the 32 classes/ranges of the full interval.

For example, when the bitdepth is 8 bits per pixel, the maximum value of a pixel can be 255. Hence, the range of pixel values is between 0 and 255. For this bitdepth of 8 bits, each class contains 8 pixel values.

For the Band Offset tool, the start of the band, represented by the grey area (40), that contains 4 ranges, is signaled in the bitstream to identify the position of the first class of pixels or the first range of pixel values. The syntax element representative of this position is called "sao_band_position" in the current HEVC specifications. This corresponds to the start of class 41 on FIG. 4. According to the current HEVC specifications, 4 consecutive classes (41, 42, 43 and 44) of pixel values are enabled which correspond to 4 offsets which are signaled in the bitstream.

Figure 5:
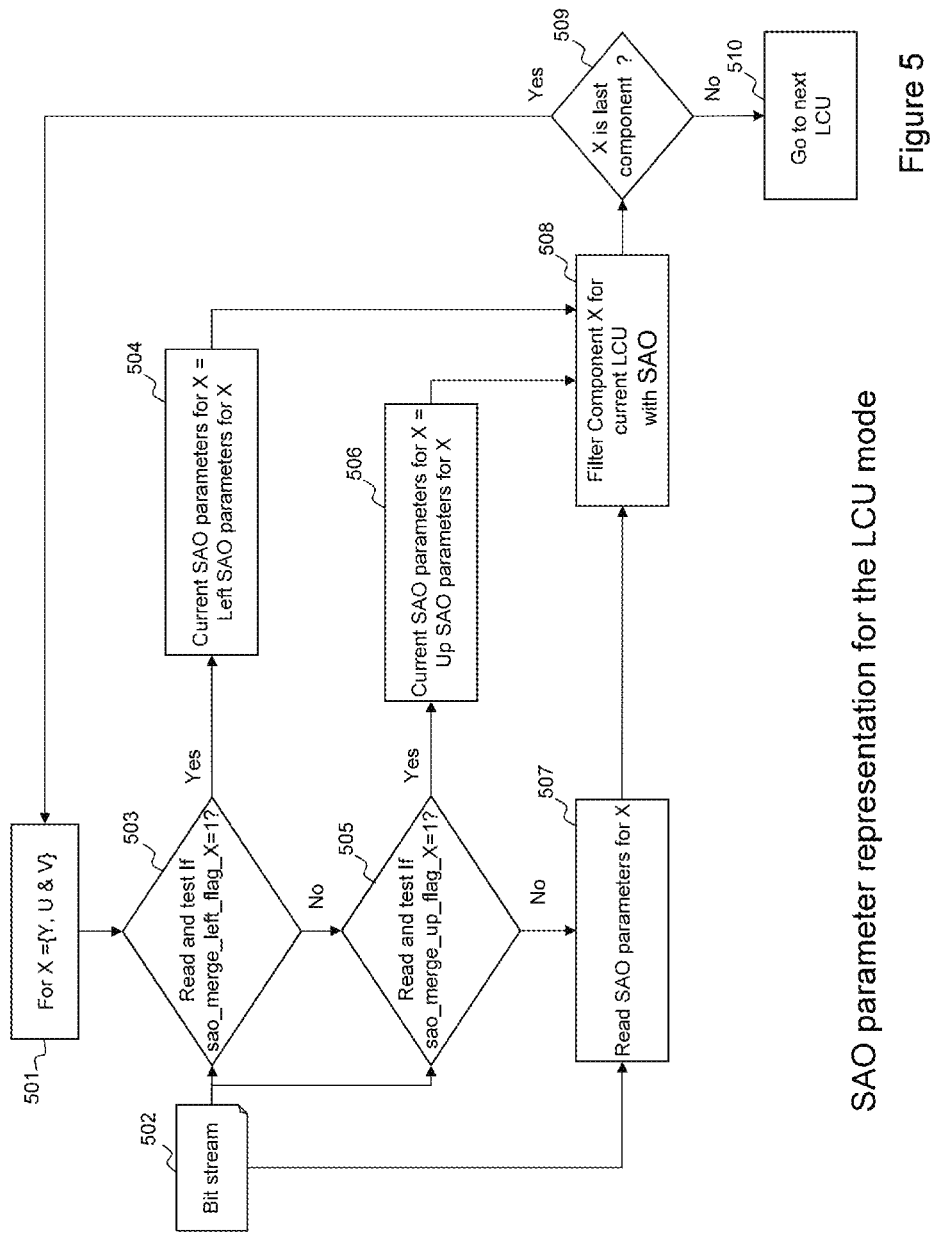
FIG. 5 is a flow chart illustrating an example of a process for schematically illustrates a data communication system in which one or more embodiments of the subject matter may be implemented SAO parameter representation for the LCU mode.

FIG. 5 is a flow chart illustrating a process for encoding SAO parameters in the context of embodiments of the claimed subject matter. More specifically, FIG. 5 shows how the SAO parameters are stored in the bitstream when the Largest Coding Unit (LCU) mode representation is used to associate one single set of SAO parameters per LCU. In order to avoid encoding one set of SAO parameters per LCU (which is very costly), a predictive scheme is used for the LCU mode. This predictive mode involves checking if the LCU on the left of the current LCU uses the same SAO parameters. If not, a second check is performed with the LCU above the current LCU. This predictive technique enables the amount of data representing the SAO parameters for the LCU mode to be reduced. The process are set out below.

In 501, the process starts by selecting the colour component of the video sequence. In the current version of HEVC, the parameters are selected for the luma component Y and for both U and V components (together). In the example of a YUV sequence the process starts with the Y component. In 503, the "sao_merge_left_flag" is read from the bitstream 502 and decoded. If its value is true, then the process proceeds to 504 where the SAO parameters of left LCU are copied for the current LCU. This enables the type of the SAO filter for the current LCU to be determined in 508.

If the outcome is negative in 503 then the "sao_merge_up_flag" is read from the bitstream and decoded. If its value is true, then the process proceeds to 505 where the SAO parameters of the above LCU are copied for the current LCU. This enables the type of the SAO filter for the current LCU to be determined in 508.

If the outcome is negative in 505, then the parameters for the current LCU are read and decoded from the bitstream in 507 where the details of this is described with reference to FIG. 8. After this, the parameters are obtained and the type of SAO filter is determined in 508.

In subsequent 509 a check is performed to determine if the three colour components (Y and U & V) for the current LCU have been processed. If the answer is positive, the determination of the SAO parameters for the three components is completed and the next LCU can be processed in 510. Otherwise, (Only Y was processed) U and V are processed together and the process restarts from initial 501 previously described.

Figure 6:
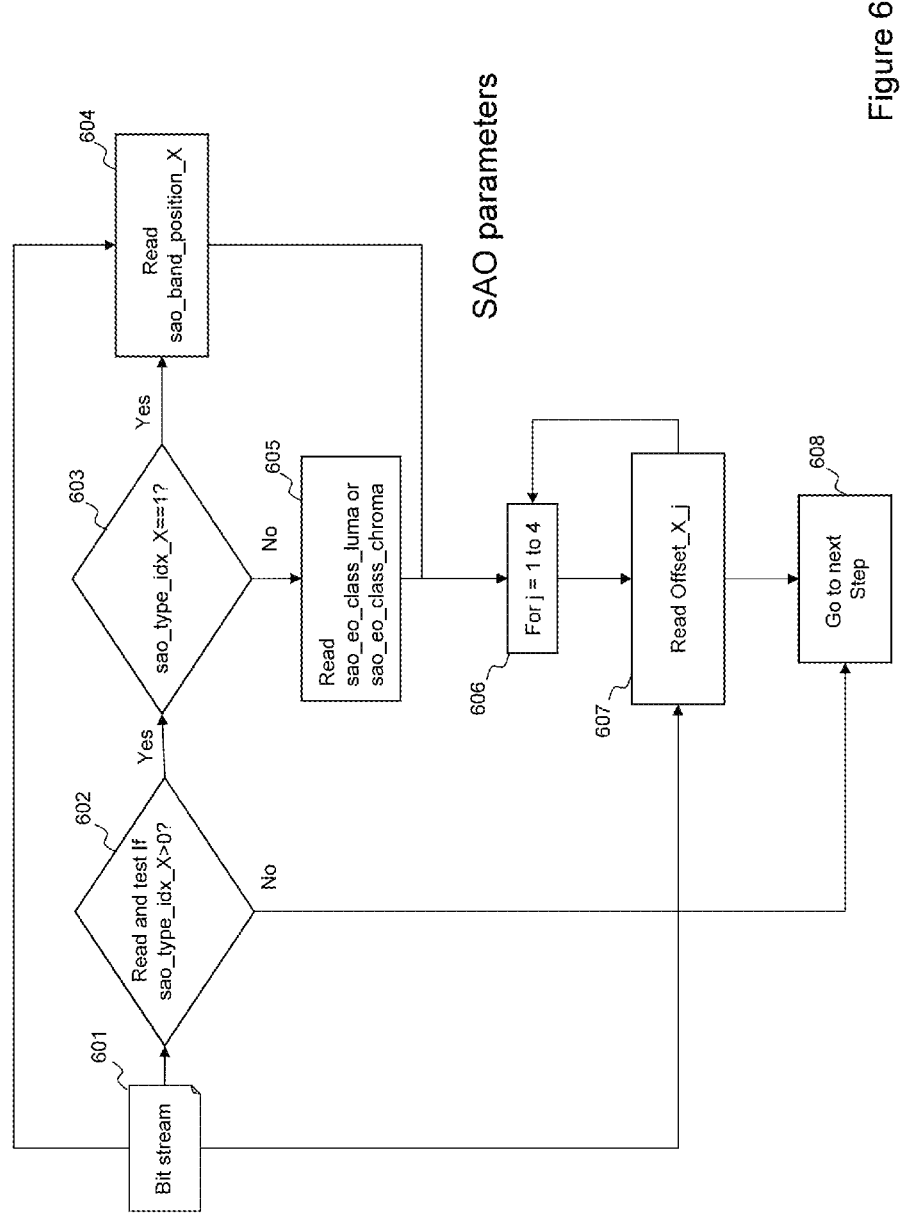
FIG. 6 is a flow chart illustrating an example of a process for SAO parameter syntax reading.

FIG. 6 is a flow chart illustrating a process of parsing of SAO parameters in the bitstream 601. In an initial 602, the "sao_type_idx_X" syntax element is read and decoded. The code word representing this syntax element can use a fixed length code or could use any method of arithmetic coding. The syntax element sao_type_idx_X" enables determination of the type of SAO applied for the frame area to be processed for the colour component Y or for both Chroma components U & V. For example, for a YUV 4:2:0 sequence, 2 components are considered: one for Y, and one for U and V. The "sao_type_idx_X" can take 3 values as follows depending on the SAO method encoded in the bitstream. 0 correspond to no SAO, 1 corresponds to the Band Offset case and 2 correspond to the Edge Offset process illustrated in FIG. 3.

In the same 602, a test is performed to determine if the "sao_type_idx_X" is strictly positive. If "sao_type_idx_X" is equal to "0" signifying that there is no SAO for this frame area for Y if X is set equal to Y and that there is no SAO for this frame area for U and V if X is set equal to U and V. The determination of the SAO parameter is completed and the process proceeds to 608. Otherwise if the "sao_type_idx" is strictly positive, this signifies that SAO parameters exist for this LCU in the bitstream. Then the process proceeds to 603 where a test is performed to determine if the type of SAO corresponds to the Band Offset case (sao_type_idx==1). If the outcome is positive, the following 604 is performed in order to read in the bitstream and to decode the position of the SAO band as illustrated in FIG. 3. If the outcome is negative in 603 ("sao_type_idx_X" is set equal to 2), this signifies that the Edge offset case is used. Consequently, the Edge Offset class (the direction of the classification 0, 45, 90 and 135 degrees is extracted from the bitstream 601 in 605. If X is equal to Y, the read syntax element is "sao_eo_class_luma" and if X is set equal to U and V, the read syntax element is "sao_eo_class_chroma".

The process proceeds to 606 where a loop is performed for 4 iterations. The 4 iterations are carried in 607 where the offset j is read and decoded from the bitstream. These 4 offsets correspond either to the 4 offsets of the 4 types of SAO Edge Offset (see FIG. 3) or to the 4 offsets related to the 4 ranges of the SAO band Offset (see FIG. 4). When the 4 offsets have been decoded, the reading of the SAO parameters is completed and the process proceeds to 607.

Figure 7:
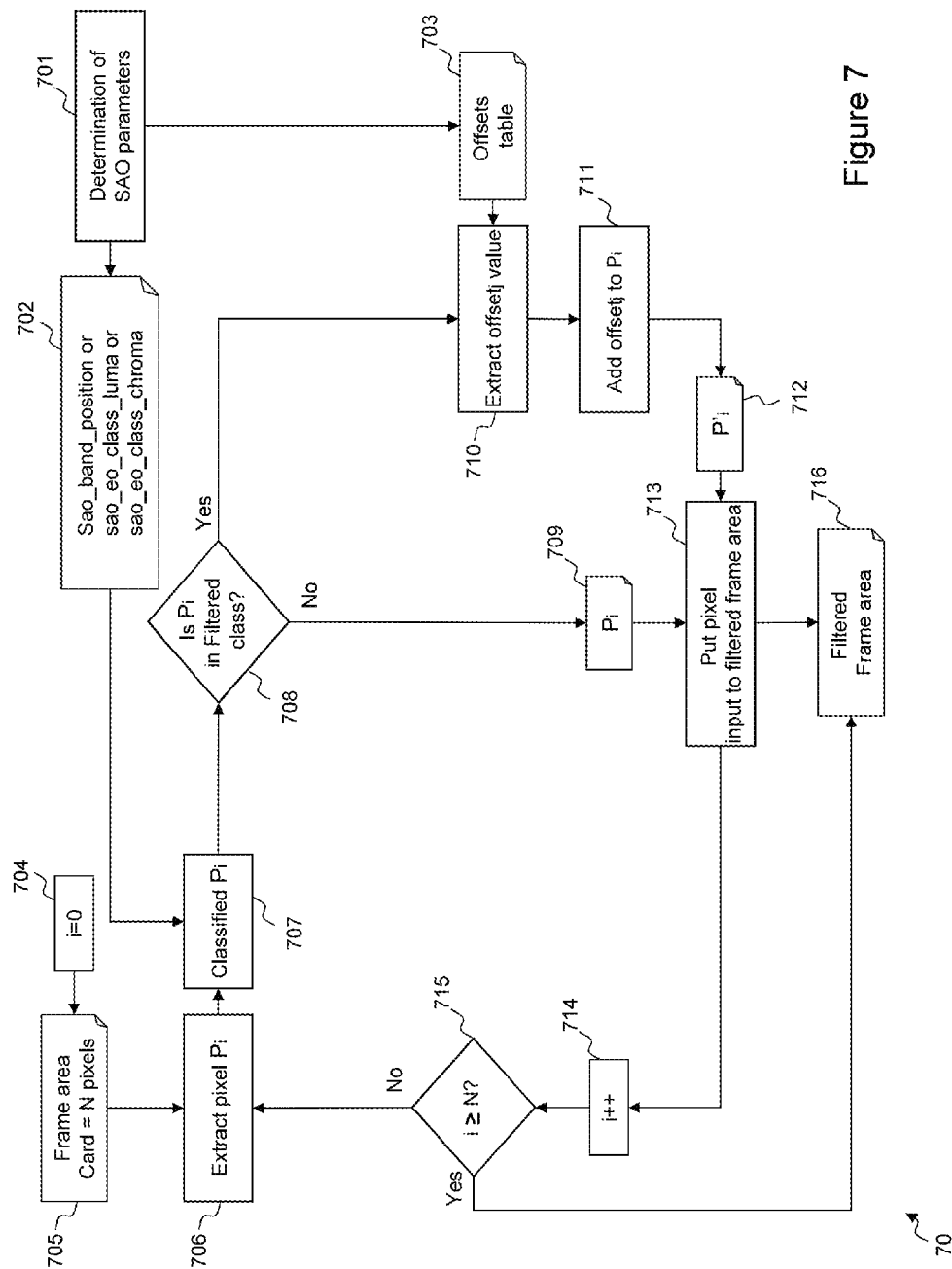
FIG. 7 is a flow chart an SAO decoding process in which one or more embodiments may be implemented.

FIG. 7 is a flow chart illustrating a decoding process in SAO classification. This decoding process is also applied at encoder side in order to produce the reference frame used for the motion estimation and compensation of the following frames. This process is related to the SAO filtering for one color component.

An initial 701 comprises determining the SAO filtering parameters according to processes depicted in FIGS. 5 and 6. 701 gives the sao_type_idx and if it equals 1 the sao_band_position 702 and if it equals 2 the sao_eo_class_luma or sao_eo_class_chroma (according to the colour component processed). It may be noted that if the element sao_type_idx is equal to 0 the SAO filtering is not applied. 701 gives also the offsets table of the 4 offsets 703. The variable i is set to 0 in 704. In 706 pixel $P_i$ is extracted from the frame area 705 (the current LCU in the HEVC standard) which contains N pixels. This pixel $P_i$ is classified in 707 according to the Edges offset classification or Band offset classification as described respectively in FIG. 3 and FIG. 4 or in accordance with embodiments of the subject matter. The decision module 708 tests if $P_i$ is in a valid class. If $P_i$ is in a filtered class, the related class number j is identified and the related offset value $Offset_j$ is extracted in 710 from the offsets table 703. This $Offset_j$ is then added to the pixel value $P_i$ in 711 in order to produce the filtered pixel value $P'_i$ 712. This filtered pixel $P'_i$ is inserted in 713 into the filtered frame area 716. If $P_i$ is not in an SAO valid class then $P_i$ (709) is inserted in 713 into the filtered frame area 716 without filtering. After 713, the variable i is incremented in 714 in order to filter if needed, 715, the subsequent pixels of the current frame area 705. After all the pixels have been processed (i>=N) in 715, the filtered frame area 716 is reconstructed and can be added to the SAO reconstructed frame (cf frame 207 of FIG. 2 or 104 of FIG. 1).

Figure 8:
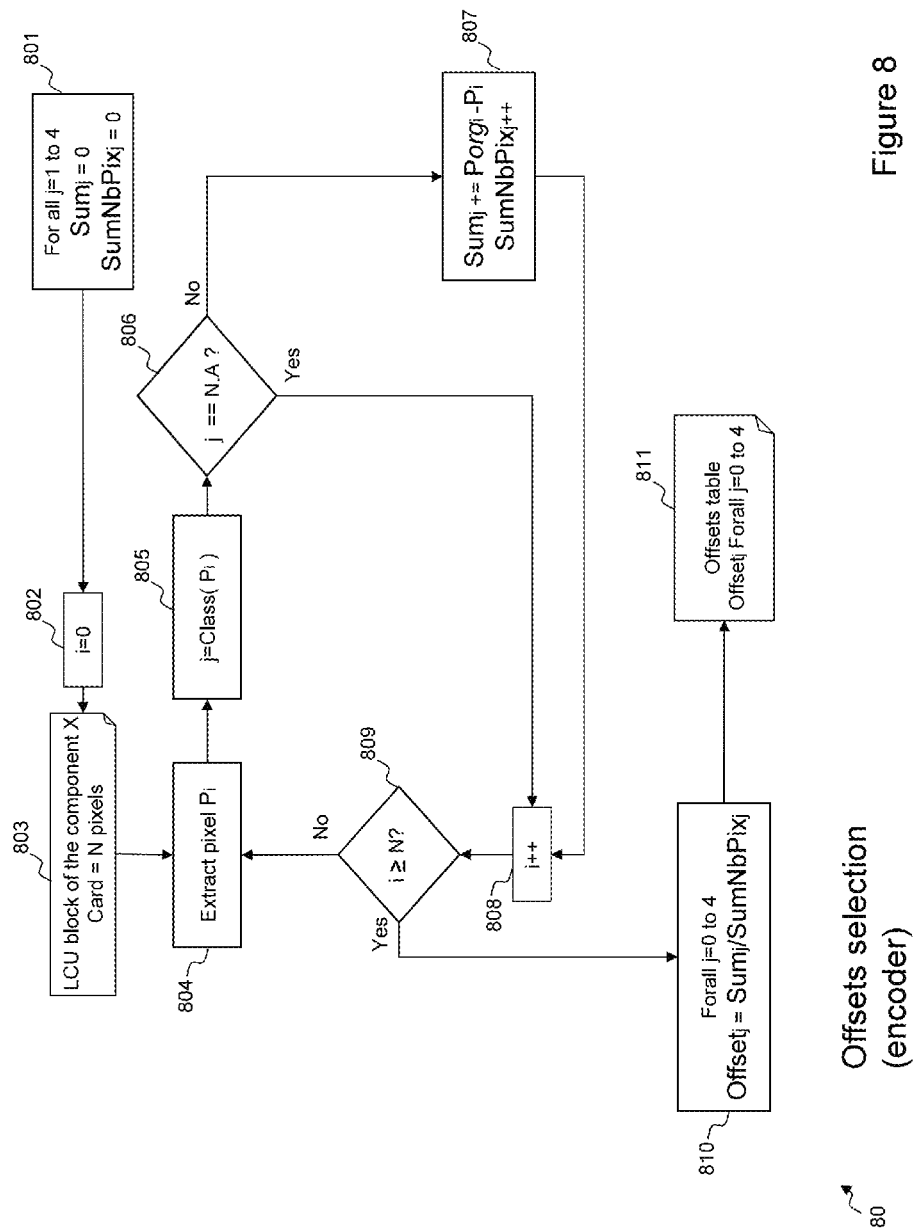
FIG. 8 is a flow chart illustrating the process of offsets determination at encoder side for the SAO of HEVC which may be applied to one or more embodiments of the subject matter.

FIG. 8 is a flow chart illustrating an example of an offset selection process at the encoder side that can be applied for the Edge Offset tool. A similar approach may also be used for the Band Offset tool.

FIG. 8 illustrates the offset selection at the encoder side for the current frame area 803. This frame area contains N pixels. In an initial 801, the variables $Sum_j$ and $SumNbPix_j$ set zero value for the ranges. j is the current range number. $Sum_j$ is the sum of the difference between the pixels in the range j and their original pixels. $SumNbPix_j$ is the number of pixels in the range j.

In 802, the variable i is set zero. Then, the first pixel of the frame area 803 is extracted in 804. In 805 the class of the current pixel is determined by looking at the conditions as defined in FIG. 3B. Then a test is performed in 805. During 805, a check is performed to determine if the class of current pixel value $P_i$ corresponds to the value "none of the above" of FIG. 3B. If the outcome is positive, then the value "i" is incremented in 808 in order to classify the next pixels of the frame area 803. Otherwise, if the outcome is negative in 806, the next to be performed is 807 where the related SumNbPix$_j$ is incremented and the difference between P$_i$ and its original value P$_i^{org}$ is added to Sum$_j$. In the next 808, the variable i is incremented in order to apply the classification to the other pixels of the frame area 803. Then a test is performed to determine if all pixels have been classified. If the outcome is positive, the process proceeds to 810 where the parameter Offset$_j$ of each class j is computed in order to compute the offset table 811 of each class j which is an outcome of the offset selection algorithm. This offset is the average of the difference between the pixels of class j and their original values. Thus, Offset$_j$ is given by the following equation:

$$\text{Offset}_j = \frac{\text{Sum}_j}{\text{SumNbPix}_j}$$

Figure 9:
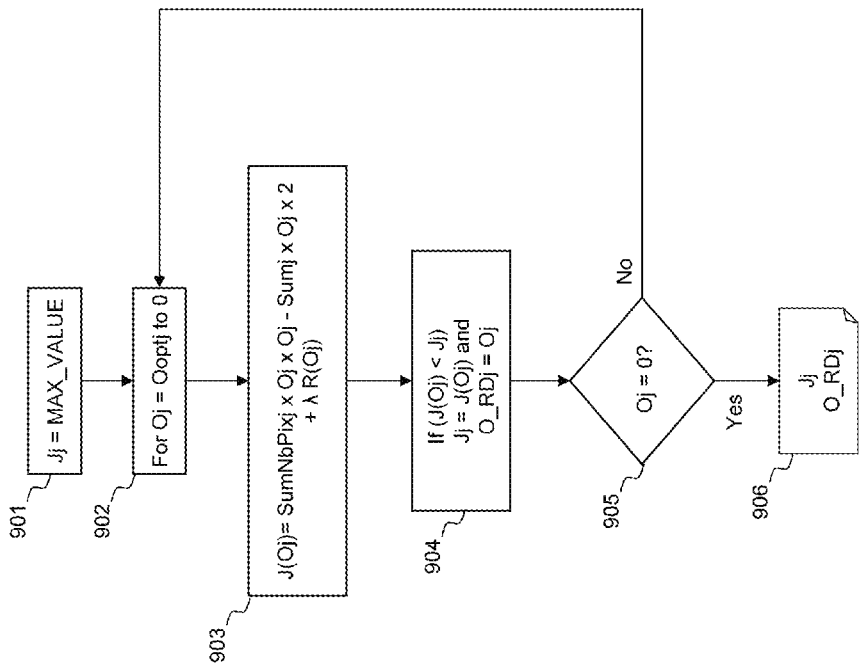
FIG. 9 is a flow chart illustrating the process of optimal offsets determination in term of RD criterion at encoder side for the SAO of HEVC which may be applied to one or more embodiments.

This offset is an optimal offset Ooptj in terms of distortion. Next, the encoding process illustrated in FIG. 9 is applied in order to find the best offset in terms of rate distortion criterion ORDj. In an initial 901 of the encoding process of FIG. 9 the rate distortion value Jj is initialized to the maximum possible value. Then a loop on Oj from Ooptj to 0 is applied in 902. If Ooptj is negative the value is incremented and if Ooptj is positive the value is decremented. The rate distortion cost related to Oj is computed in 903 according to the following formula:

$$J(O_j) = \text{Sum}NbPix_j \times O_j \times O_j - \text{Sum}_j \times O_j \times 2 + \lambda R(O_j)$$

where λ is the Lagrange parameter and R(O$_j$) is a function which provides the number of bits needed for the code word associated with Oj. Formula 'SumNbPix$_j$×O$_j$×O$_j$−Sum$_j$×O$_j$× 2' gives the improvement in terms of the distortion given by the offset Oj. If J(Oj) is inferior to Jj then Jj=J(Oj) and ORDj is equal to Oj in 904. If Oj is equal to 0 in 905, the loop ends and the best ORDj for the class j is selected.

This algorithm for selecting the offset value at the encoder side for the Edge offset tool can be easily applied to the Band Offset tool to select the best position (SAO_band_offset position) where j is in the interval [0,32] instead of the interval [1,4] in FIG. 8. It involves changing the value 4 to 32 in modules 801, 810, 811. More specifically, for the 32 classes of FIG. 4, the parameter Sum$_j$ (j=[0,32]) is computed. This corresponds to computing for each range j, the difference between the current pixel value (P$_i$) and its original value (Porg$_i$), each pixel of the image belonging to a single range j. Then the best offset in terms of rate distortion ORDj is computed for the 32 classes, with the same process as described in FIG. 9.

Figure 10:
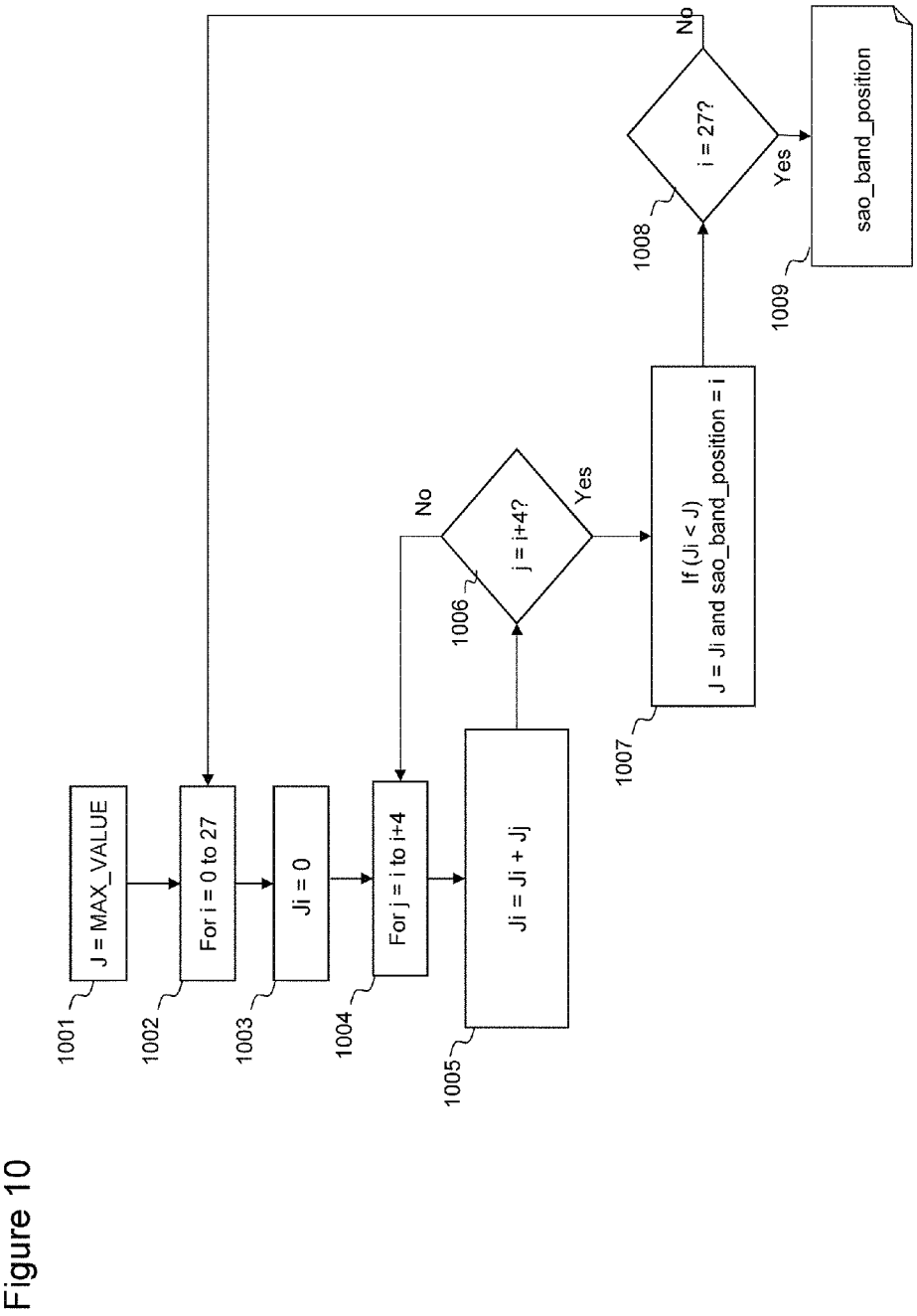
FIG. 10 is a flow chart illustrating a process of sao band position determination at encoder side for the SAO band offset of HEVC which may be applied to one or more embodiments.

The next aspect involves finding the best position of the SAO band position of FIG. 4. This is determined with the encoding process set out in FIG. 10. The RD cost Jj for each range has been computed with the encoding process of FIG. 8 with the optimal offset ORDj in terms of rate distortion. In FIG. 10, in an initial 1001 the rate distortion value J is initialized to the maximum possible value. Then a loop on the 28 positions j of the 4 consecutive classes is run in 1002. Then the variable Jj corresponding to the RD cost of the band (of 4 consecutive classes) is initialized to 0 in 1003. Then the loop on the four consecutive offset J is run in 1004. Jj is incremented for the RD cost of the four classes Ji in 1005. If this cost Jj is inferior to the Best RD cost the value J=Ji, and sao_band_position=i in 1007. If the loop on the 28 positions ends in 1008 and the encoding process selects the best sao_band_position 1009.

Figure 11:
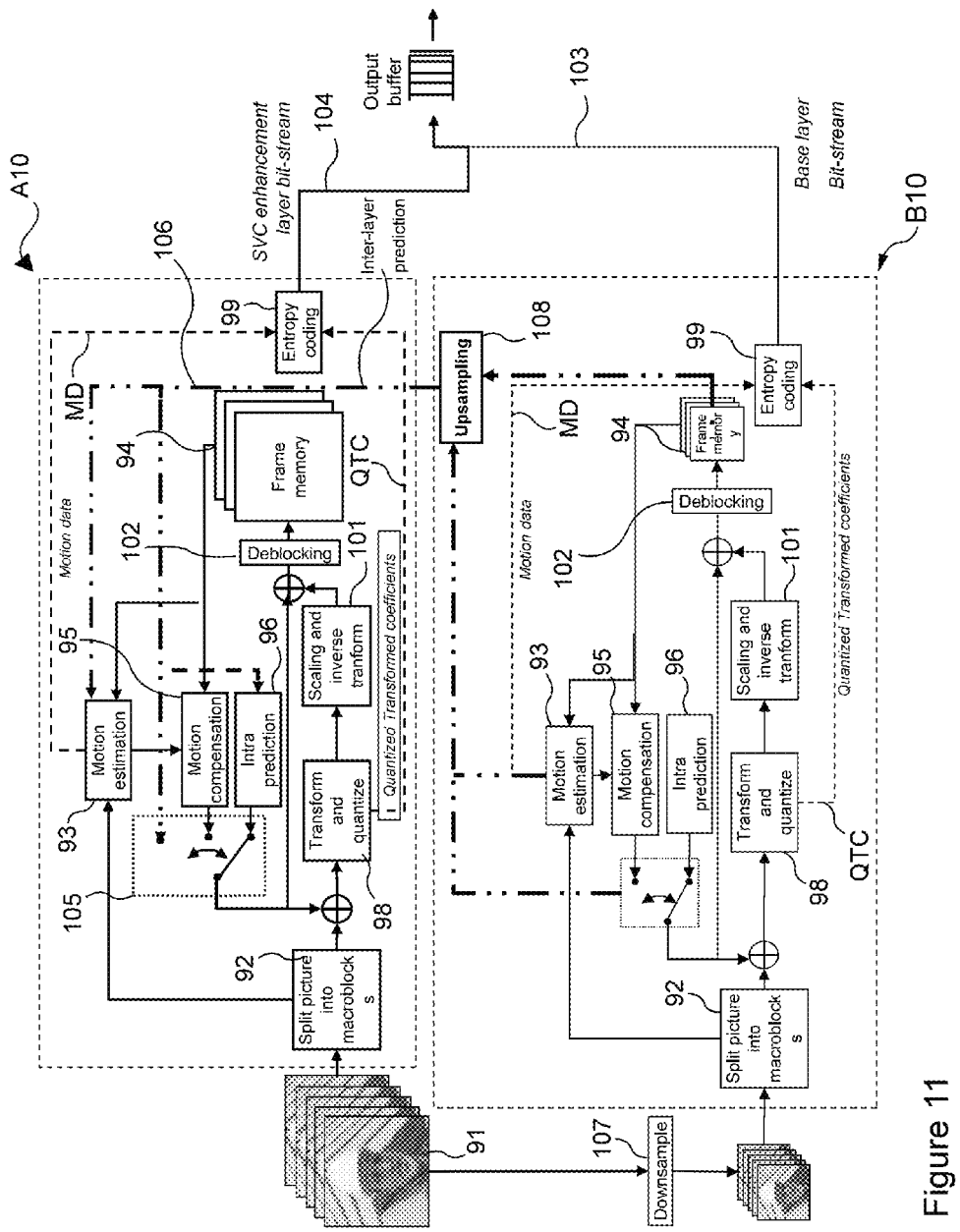
FIG. 11 is a block diagram illustrating the architecture of a video scalable encoder in which one or more embodiments of the subject matter may be implemented.

FIG. 11 is a block diagram of a scalable video encoder in which one or more embodiments of the subject matter herein may be implemented and which comprises a straightforward extension of the standard video coder of FIG. 1, towards a scalable video coder. This video encoder may comprise a number of subparts or stages, illustrated here are two subparts or stages A10 and B10 producing data corresponding to a base layer 103 and data corresponding to one enhancement layer 104. Each of the subparts A10 and B10 follows the principles of the standard video encoder 90, with the transformation, quantization and entropy coding being applied in two separate paths, one corresponding to each layer.

Figure 12:
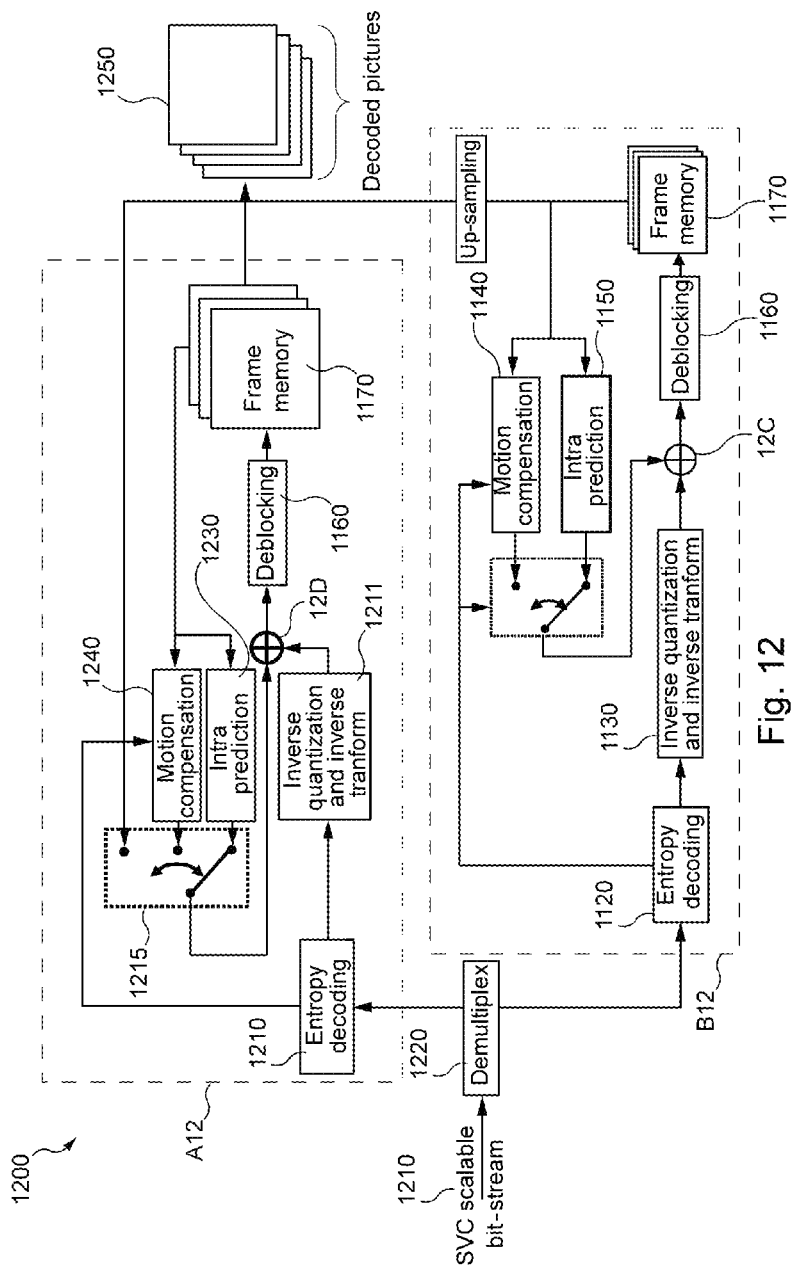
FIG. 12 is a block diagram illustrating the architecture of a video scalable decoder in which one or more embodiments may be implemented.

The first stage B10 aims at encoding the HEVC compliant base layer of the output scalable stream, and hence is (or can be) identical to the encoder of FIG. 1. Next, the second stage A10 illustrates the coding of an enhancement layer on top of the base layer. This enhancement layer brings a refinement of the spatial resolution to the (down-sampled 107) base layer. As illustrated in FIG. 11, the coding scheme of this enhancement layer is similar to that of the base layer, except that for each coding unit of a current picture 91 being compressed or coded, an additional prediction mode can be chosen by the coding mode selection module 105. This new coding mode corresponds to the inter-layer prediction 106. Inter-layer prediction 106 comprises re-using the data coded in a layer lower than current refinement or enhancement layer, as prediction data of the current coding unit. The lower layer used is called the reference layer for the inter-layer prediction of the current enhancement layer. In case the reference layer contains a picture that temporally coincides with the current picture, then it is called the base picture of the current picture. The co-located block (at same spatial position) of the current coding unit that has been coded in the reference layer can be used as a reference to predict the current coding unit. More precisely, the prediction data that can be used in the co-located block corresponds to the coding mode, the block partition, the motion data (if present) and the texture data (temporal residual or reconstructed block). In case of a spatial enhancement layer, some up-sampling 108 operations of the texture and prediction data are performed FIG. 12 is a block diagram of a scalable decoder 1200 in which one or more embodiments of the subject matter herein may be implemented and which would apply on a scalable bit-stream composed of two scalability layers, e.g. comprising a base layer and an enhancement layer. This decoding process is thus the reciprocal processing of the scalable coding process of FIG. 11. The scalable stream being decoded 1210, as shown in FIG. 12, is made of one base layer and one spatial enhancement layer on top of the base layer, which are demultiplexed 1220 into their respective layers.

The first stage of FIG. 12 concerns the base layer decoding process B12. As previously explained for the non-scalable case, this decoding process starts by entropy decoding 1120 each coding unit or block of each coded picture in the base layer. This entropy decoding 1120 provides the coding mode, the motion data (reference pictures indexes, motion vectors of INTER coded macroblocks), the intra prediction direction data and residual data. This residual data comprises of quantized and transformed DCT coefficients. Next, these quantized DCT coefficients undergo inverse quantization and inverse transform operations 1130. Motion compensation 1140 or Intra prediction 1150 data are added 12C.

Next, the decoded motion and temporal residual for INTER blocks, and the post filtered reconstructed blocks are stored into a frame buffer in the first of the scalable decoder of FIG. 12. Such frames contain the data that can be used as reference data to predict an upper scalability layer.

Next, the second stage of FIG. 12 performs the decoding of a spatial enhancement layer A12 on top of the base layer decoded by the first stage. This spatial enhancement layer decoding involves the entropy decoding of the second layer 1210, which provides the coding modes, motion information as well as the transformed and quantized residual information of blocks of the second layer.

Next, involves predicting blocks in the enhancement picture. The choice 1215 between different types of block prediction (INTRA, INTER or inter-layer) depends on the prediction mode obtained from the entropy decoding 1210.

Concerning INTRA blocks, their treatment depends on the type of INTRA coding unit.

In the case of inter-layer predicted INTRA block (Intra-BL coding mode), the result of the entropy decoding 1210 undergoes inverse quantization and inverse transform 1211, and then is added 12D to the co-located block of current block in base picture, in its decoded, post-filtered and up-sampled (in case of spatial scalability) version.

In the case of a non-Intra-BL INTRA block, such a block is fully reconstructed, through inverse quantization, inverse transform to obtain the residual data in the spatial domain, and then INTRA prediction 1230 to obtain the fully reconstructed block 1250.

Concerning INTER blocks, their reconstruction involves their motion compensated 1240 temporal prediction, the residual data decoding and then the addition of their decoded residual information to their temporal predictor. In this INTER block decoding process, inter-layer prediction can be used in two ways. First, the motion vectors associated to the considered block can be decoded in a predictive way, as a refinement of the motion vector of the co-located block in the base picture. Second, the temporal residual can also be inter-layer predicted from the temporal residual of the co-sited block in the base layer.

Note that in a particular scalable coding mode of the block all the prediction information of the block (e.g. coding mode, motion vector) may be fully inferred from the co-located block in the base picture. Such block coding mode is known as so-called "base mode"

Figure 13:
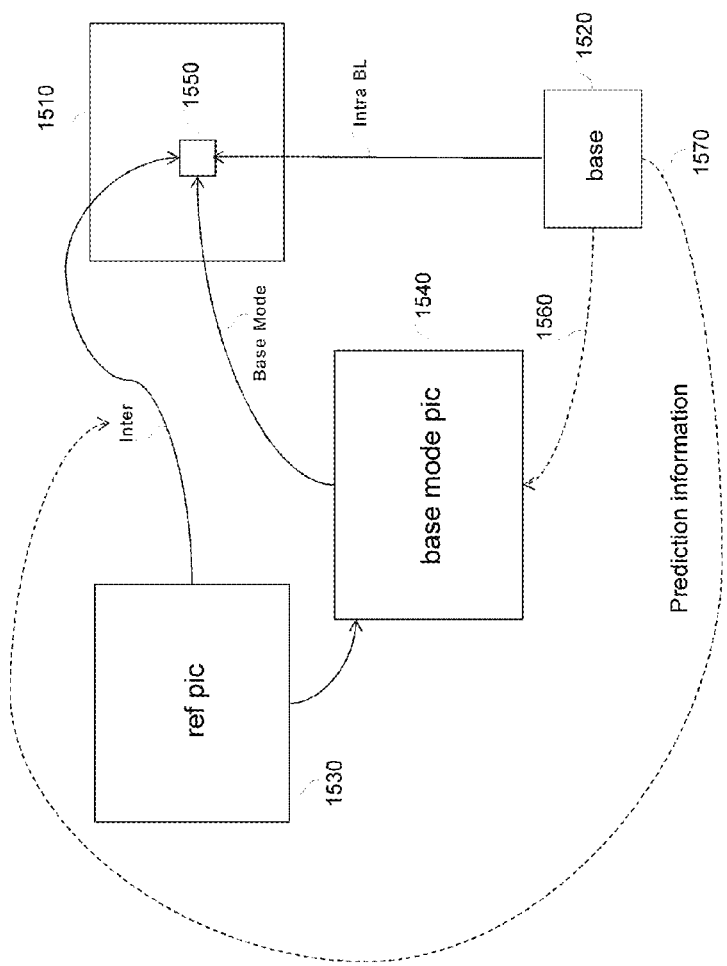
FIG. 13 schematically illustrates examples of scalable coding modes.

The enhancement layer in scalable video coding can use data from the base layer as Intra and Inter coding. The modes which use data from the base layer are known as Inter layer. Several Inter layer modes or Hybrid Inter layer and Intra or Inter coding modes are known FIG. 13 schematically summarizes the prediction modes that can be used in the proposed scalable codec architecture, according to an embodiment of the subject matter, to predict a current enhancement picture. Schematic 1510 corresponds to the current enhancement image to predict. The base picture 1520 corresponds to the base layer decoded picture that temporally coincides with current enhancement picture. Schematic 1530 corresponds to an example reference picture in the enhancement layer used for the temporal prediction of current picture 1510. Finally, schematic 1540 corresponds to the Base Mode prediction picture introduced above.

As illustrated by FIG. 13, and as explained above, the prediction of current enhancement picture 1510 comprises determining, for each block 1550 in the current enhancement picture 1510, the best available prediction mode for the that block 1550, considering temporal prediction, Intra BL prediction and Base Mode prediction.

The Intra BL mode comprises up sampling the pixel values of the decoded Base layer. This mode can be applied block by block or for the whole frame.

FIG. 13 also illustrates the fact that the prediction information contained in the base layer is extracted, and then is used in two different ways.

First, the prediction information of the base layer is used to construct 1560 the "Base Mode" prediction picture 1540. Please note that block by block derivation of the base mode can also be considered.

Second, the base layer prediction information is used in the predictive coding 1570 of motion vectors in the enhancement layer. Therefore, the INTER prediction mode illustrated on FIG. 13 makes use of the prediction information contained in the base picture 1520. This allows inter-layer prediction of the motion vectors of the enhancement layer, hence increases the coding efficiency of the scalable video coding system.

Methods for classifying samples of an image into a plurality of classes in accordance with embodiments of the subject matter herein will now be described with reference to FIGS. 14 and 16. In what follows, a sample may refer to a single pixel of an image, with a sample value corresponding to the respective pixel value. Alternatively a sample may comprise a plurality of pixels, where a sample value corresponds to a pixel value determined from the pixel values of the plurality of pixels. Moreover, a sample may correspond to one of the colour components (YUV) constituting a pixel. The methods according to embodiments of the subject matter include classifying samples of an image into a plurality of sample. Each sample has a respective sample value and the following are included. Each of the samples is allocated to a class of a plurality of classes. The class allocated to each sample is determined in dependence upon the sample value of the said sample with respect to the sample values of first neighbouring samples of said sample according to a given direction and further in respect to the sample values of the first neighbouring samples with respect to the sample values of samples neighbouring the first neighbouring samples according to the said given direction.

Each sample may then be processed according to the respective allocated class. For example each class may have an associated compensation offset which may be applied to each sample of the class in a SAO process of a loop filter.

As mentioned in relation to FIG. 3A classification for SAO processes may comprise determining a class for a pixel based on the derivative of the signal at the position of the current pixel. In an embodiment of the claimed subject matter, a class for a sample is determined based on the third derivative of the signal at the position of the current pixel. In a particular embodiment, the proposed classification involves analyzing the sign of the derivative of the second derivative of the signal at the position of the current sample. In a particular embodiment, the proposed classification involves analyzing a representation of the third derivative of the signal at the position of the current sample.

Figure 14:
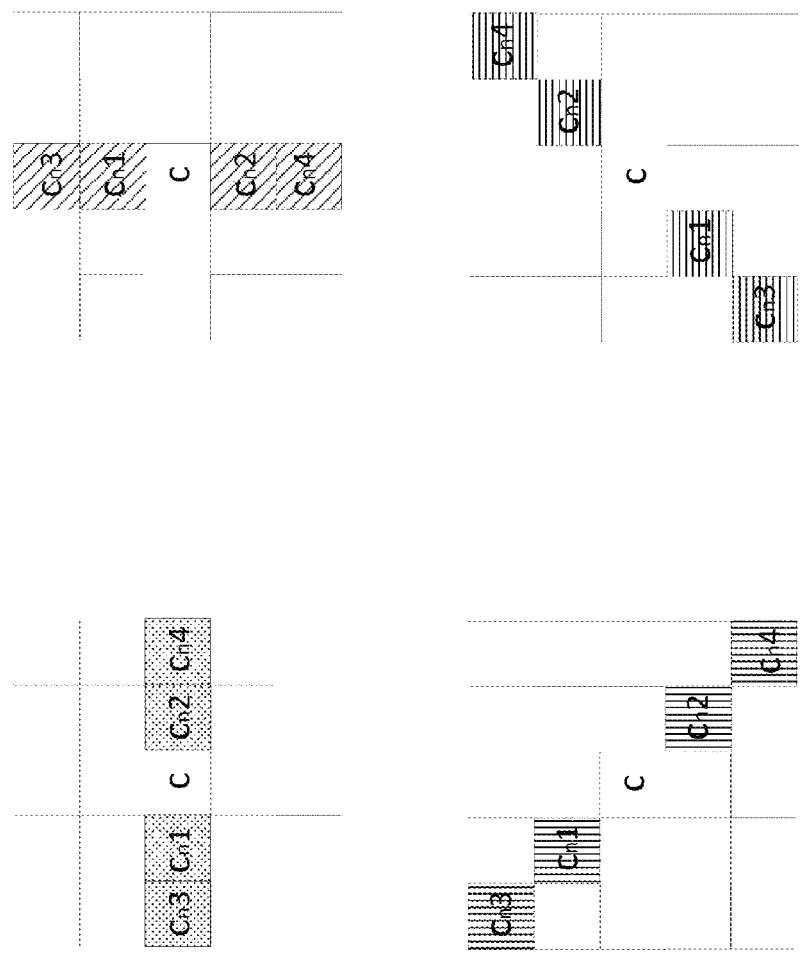
FIG. 14 illustrates samples used in SAO classification according to an embodiment.

In accordance with one embodiment of the subject matter herein for a predefined direction, the classification for a pixel is obtained by computing the following formula for the Edge Index classification:

$$\text{EdgeIndex}=\text{sign}[(((c<<1)-c_n1-c_n2+2)>>2)-\\ (((c_n2<<1)-c-c_n4+2)>>2)]-\text{sign}[(((c_n1>>1)-\\ c_n3-c+2)>>2)-(((c<<1)-c_n1-c_n2+2)>>2)]+2 \quad (1)$$

where c, $c_n1$, $c_n2$, $c_n3$ and $c_n4$ are the pixels depicted for the 4 directions in FIG. 14:

c is the sample value of the said sample $c_n1$ is the sample value of a first sample neighbouring the said sample according to the given direction $c_n2$ is the sample value of a second sample neighbouring the said sample according to the given direction $c_n3$ is the sample value of a third sample neighbouring the first sample according to the given direction $c_n4$ is the sample value of a fourth sample neighbouring the second sample according to the given direction sign[.] is a function defined as sign[x]=1, when x>0 sign[x]=−1, when x<0 sign[x]=0, when x=0

The symbol ">>" represents the right shift operator. Hence ">>2" is equivalent for Integer operations to a division by 4. The symbol "<<" is the left shift operator. Hence "<<1" is equivalent for Integer operations to a multiplication by 2. As a consequence, equation (1) can be re-written as follows:

$$\text{EdgeIndex}=\text{sign}[((2c-c_n1-c_n2+2)/4)-((2c_n2-c-c_n4+2)/4)]-\text{sign}[((2c_n1-c_n3-c+2)/4)-((2c-c_n1-c_n2+2)/4)]+2 \quad (2)$$

In equation (2), the term "$2c-c_n1-c_n2$" represents the second derivative of the signal at the position of the current pixel c, "$2c_n2-c-c_n4$" is the second derivative at the position of the pixel $c_n2$ (the right neighboring pixel when the horizontal direction is selected) and "$2c_n1-c_n3-c$" is the second derivative of the signal at the position of the pixel $c_n1$ (the left pixel when the horizontal direction is selected). In a particular embodiment, an approximation of the second derivative is obtained by applying a high-pass filter, This high pass filter is separable if the filter is applied independently in the vertical and the horizontal directions. Otherwise, the filter is non-separable when a convolution matrix is defined.

Some of the computation can be shared between pixels for purposes of simplification. If, for example, a raster scan pixel order is considered. Indeed, when the raster scan order of a pixel is used, in this equation, the terms:

$((2c-c_n1-c_n2+2)/4)$ and $((2c_n1-c_n3-c+2)/4)$ have already been computed for the previous pixels. Consequently, only the term $((2c_n2-c-c_n4+2)/4)$ needs to be evaluated with the signs. It is a limited increase of complexity compared to the previous techniques SAO computation: only 2 shifts and one addition are added to the operation compared to the previous techniques of SAO classification.

The selection process of offset and direction as previously described may be applied to embodiments of the subject matter herein. The proposed methods of classification in accordance with embodiments of the subject matter herein may be applied in 805 of FIG. 8.

SAO process can be applied at different parts of the video coding and decoding. For example, in one embodiment the SAO can be applied as a loop filter (after the decoding image), or on a predictor as for scalable codec where SAO can be applied on the up sampled base layer. In addition, the SAO filtering may be cascaded such that several SAO processes can be applied on the same LCU or frame or predictor. Consequently, the proposed SAO classification in accordance with embodiments of the subject matter herein can be used as a loop filter, or interlayer filter etc., and may be cascaded.

It will be understood that the methods of classification in accordance with embodiments of the subject matter herein can be applied to any other type of process requiring classification of samples.

There exist several alternative possibilities for computing a second derivative for instance for term "$2c_n2-c-c_n4$". For a 2D signal the second derivative may be obtained by the convolution product of the matrix of the current pixel and its neighboring pixels with one of the three matrices of FIG. 16. Of course these matrices are not restrictive and other matrices can be found. In practice the second derivative may be obtained using a high pass filter. The high pass filter may involve two separate 1D filters or an inseparable filter corresponding to convolution matrices.

Figure 16:
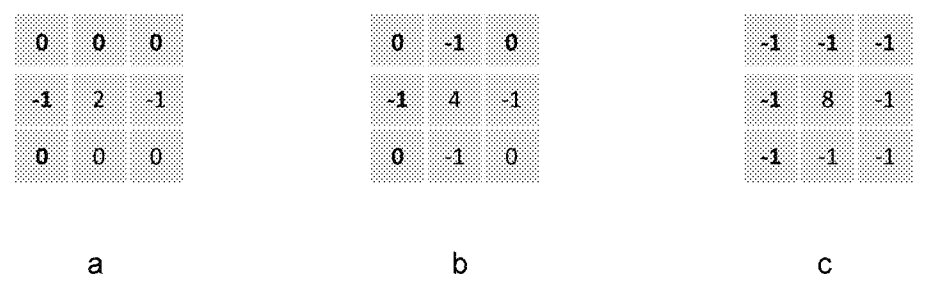

Equation (2) may be obtained with matrix "a" of FIG. 16.

$$\text{EdgeIndex}=\text{sign}[((2c-c_n1-c_n2+2)/4)-((2c_n2-c-c_n4+2)/4)]-\text{sign}[((2c_n1-c_n3-c+2)/4)-((2c-c_n1-c_n2+2)/4)]+2 \quad (2)$$

Figure 15:
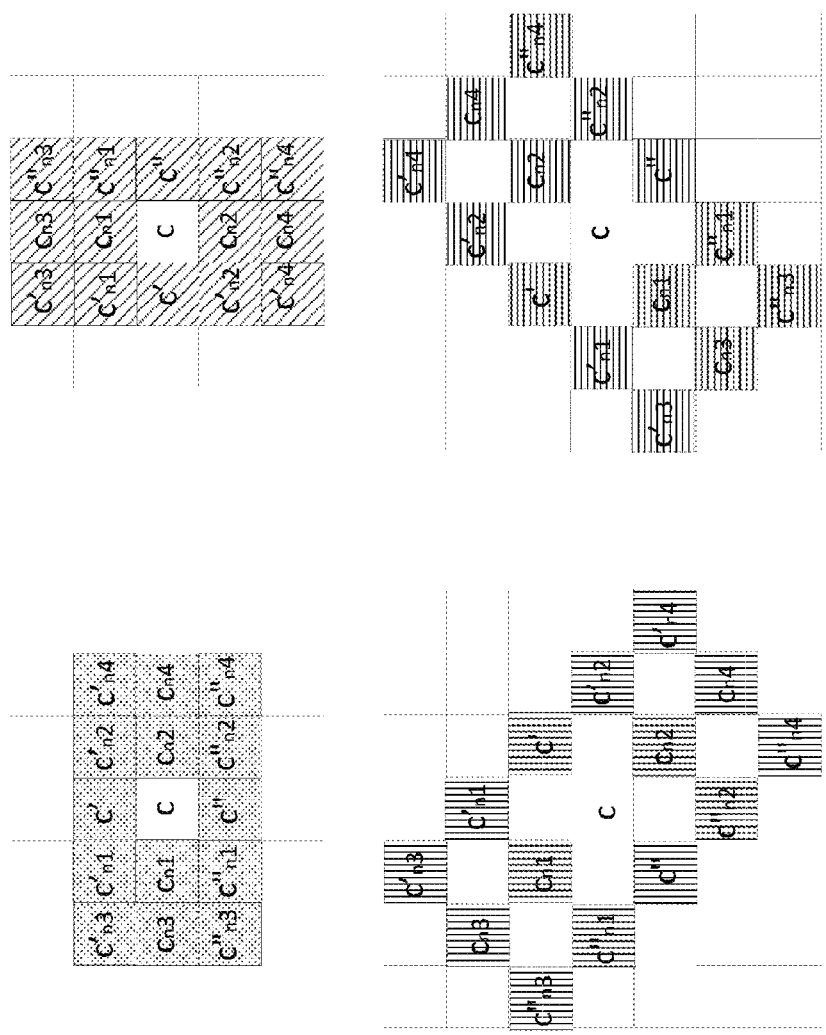
FIG. 15 illustrates samples used in SAO classification according to another embodiment.

By considering the pixel shown in FIG. 15 the previous equation becomes with matrix "b" of FIG. 16

$$\text{EdgeIndex}=\text{sign}[((4c-cn1-cn2-c'-c''+4)/8)-((4cn2-c-cn4-c'n2-c''n2+4)/8)]-\text{sign}[((4cn1-cn3-c-c'n1-c''n1+4)/8)-((4c-cn1-cn2-c'-c''+4)/8)]+2 \quad (3)$$

For matrix "c" of FIG. 16

$$\text{EdgeIndex}=\text{sign}[((8c-cn1-c'n1-c''n1-cn2-c'n2-c''n2-c'-c''+8)/16)-((8cn2-c-c'-c''-cn4-c'n4-c''n4-c'n2-c''n2+8)/16)]-\text{sign}[((8cn1-cn3-c'n3-c''n3-c-c'-c''-c'n1-c''n1+8)/16)-((4c-cn1-c'n1-c''n1-cn2-c'n2-c''n2-c'-c''+8)/16)]+2 \quad (4)$$

where:

c is the sample value of the current sample $c_n1$ is the sample value of a first sample neighbouring the current sample according to the given direction $c_n2$ is the sample value of a second sample neighbouring the current sample according to the given direction $c_n3$ is the sample value of a third sample neighbouring the first sample according to the given direction $c_n4$ is the sample value of a fourth sample neighbouring the second sample according to the given direction c' is the sample value of a fifth sample neighboring the current sample according to a direction perpendicular to the given direction c'' is the sample value of a sixth sample neighboring the current sample according to a direction perpendicular to the given direction $c'_n1$ is the sample value of a seventh sample neighboring the first neighbouring sample of the current sample according to a direction perpendicular to the given direction $c''_n1$ is the sample value of an eighth sample neighboring the first neighbouring sample of the current sample according to a direction perpendicular to the given direction $c'_n2$ is the sample value of a ninth sample neighboring the second neighbouring sample of the current sample according to a direction perpendicular to the given direction $c''_n2$ is the sample value of a tenth sample neighboring the second neighbouring sample of the current sample according to a direction perpendicular to the given direction $c'_n3$ is the sample value of an eleventh sample neighboring the third neighbouring sample of the current sample according to a direction perpendicular to the given direction $c''_n3$ is the sample value of a twelfth sample neighboring the third neighbouring sample of the current sample according to a direction perpendicular to the given direction $c'_n4$ is the sample value of a thirteenth sample neighboring the fourth neighbouring sample of the current sample according to a direction perpendicular to the given direction $c''_n4$ is the sample value of a fourteenth sample neighboring the fourth neighbouring sample of the current sample according to a direction perpendicular to the given direction FIG. 15 schematically illustrates the pixels used in equation (4) for the four directions.

Figure 17:
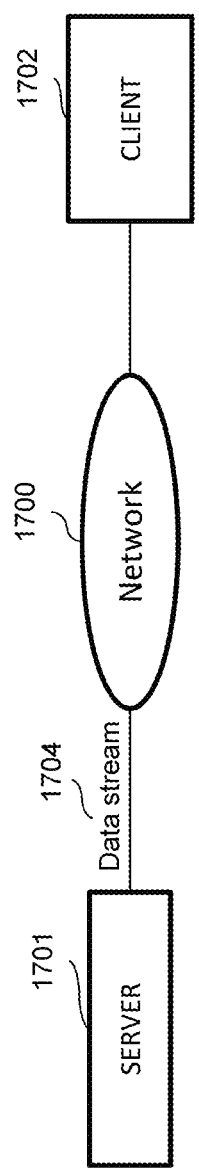
FIG. 17 schematically illustrates a data communication system in which one or more embodiments may be implemented.

FIG. 17 schematically illustrates a data communication system in which one or more embodiments may be implemented. The data communication system comprises a transmission device, in this case a server 1701, which is operable to transmit data packets of a data stream to a receiving device, in this case a client terminal 1702, via a data communication network 1700. The data communication network 1700 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the subject matter the data communication system may be a digital television broadcast system in which the server 1701 sends the same data content to multiple clients.

The data stream 1704 provided by the server 1701 may be composed of multimedia data representing video and audio data. Audio and video data streams may, in some embodiments of the subject matter, be captured by the server 1701 using a microphone and a camera respectively. In some embodiments data streams may be stored on the server 1701 or received by the server 1701 from another data provider, or generated at the server 1701. The server 1701 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format.

The client 1702 receives the transmitted bitstream and decodes the reconstructed bitstream to reproduce video images on a display device and the audio data by a loud speaker.

Although a streaming scenario is considered in the example of FIG. 17, it will be appreciated that in some embodiments of the subject matter the data communication between an encoder and a decoder may be performed using for example a media storage device such as an optical disc.

In one or more embodiments of the subject matter a video image is transmitted with data representative of compensation offsets for application to reconstructed pixels of the image to provide filtered pixels in a final image.

Figure 18:
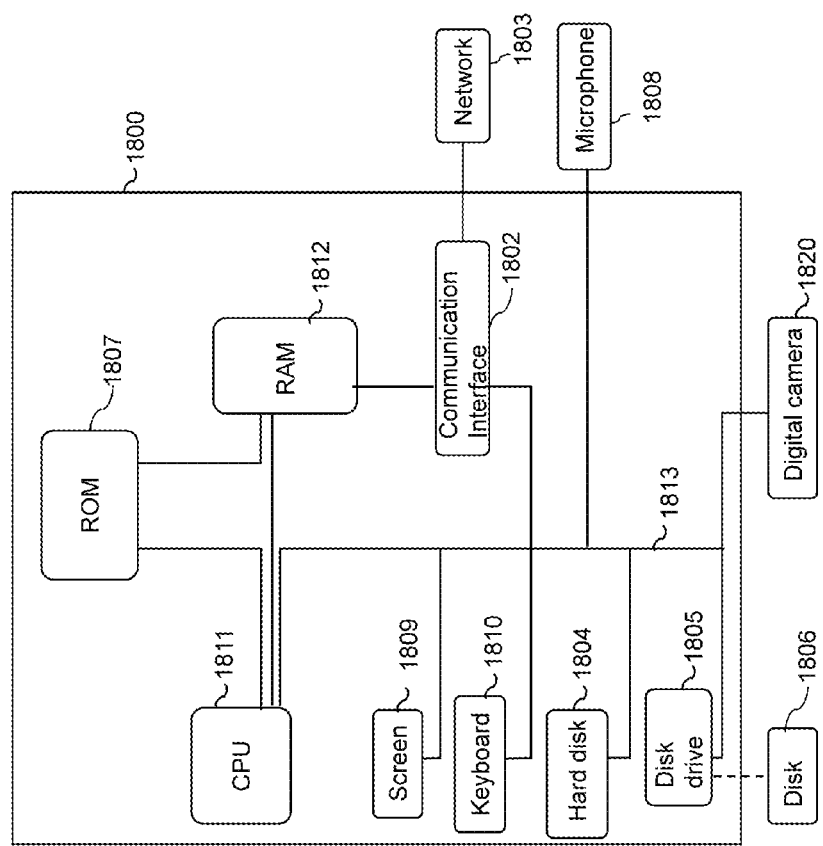
FIG. 18 schematically illustrates a processing device 1800 configured to implement at least one embodiment.

FIG. 18 schematically illustrates a processing device 1800 configured to implement at least one embodiment of the present subject matter. The processing device 1800 may be a device such as a micro-computer, a workstation or a light portable device. The device 1800 comprises a communication bus 1813 connected to:

- a central processing unit 1811, such as a microprocessor, denoted CPU;
- a read only memory 1807, denoted ROM, for storing computer programs for implementing the subject matter;
- a random access memory 1812, denoted RAM, for storing the executable code of the method of embodiments of the subject matter as well as the registers adapted to record variables and parameters necessary for implementing the method of encoding a sequence of digital images and/or the method of decoding a bitstream according to embodiments of the subject matter; and
- a communication interface 1802 connected to a communication network 1803 over which digital data to be processed are transmitted or received Optionally, the apparatus 1800 may also include the following components:

- a data storage means 1804 such as a hard disk, for storing computer programs for implementing methods of one or more embodiments of the subject matter and data used or produced during the implementation of one or more embodiments of the subject matter;
- a disk drive 1805 for a disk 1806, the disk drive being adapted to read data from the disk 1806 or to write data onto said disk;
- a screen 1809 for displaying data and/or serving as a graphical interface with the user, by means of a keyboard 1810 or any other pointing means.

The apparatus 1800 can be connected to various peripherals, such as for example a digital camera 1820 or a microphone 1808, each being connected to an input/output card (not shown) so as to supply multimedia data to the apparatus 1800.

The communication bus provides communication and interoperability between the various elements included in the apparatus 1800 or connected to it. The representation of the bus is not limiting and in particular the central processing unit is operable to communicate instructions to any element of the apparatus 1800 directly or by means of another element of the apparatus 1800.

The disk 1806 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the subject matter to be implemented.

The executable code may be stored either in read only memory 1807, on the hard disk 1804 or on a removable digital medium such as for example a disk 1806 as described previously. According to a variant, the executable code of the programs can be received by means of the communication network 1803, via the interface 1802, in order to be stored in one of the storage means of the apparatus 1800 before being executed, such as the hard disk 1804.

The central processing unit 1811 is adapted to control and direct the execution of the instructions or portions of software code of the program or programs according to the subject matter, instructions that are stored in one of the aforementioned storage means. On powering up, the program or programs that are stored in a non-volatile memory, for example on the hard disk 1804 or in the read only memory 1807, are transferred into the random access memory 1812, which then contains the executable code of the program or programs, as well as registers for storing the variables and parameters necessary for implementing the subject matter herein.

In this embodiment, the apparatus is a programmable apparatus which uses software to implement the subject matter herein. However, alternatively, the present subject matter may be implemented in hardware (for example, in the form of an Application Specific Integrated Circuit or ASIC).

Although the present subject matter has been described hereinabove with reference to specific embodiments, the present subject matter claimed herein is not limited to the specific embodiments, and modifications will be apparent to a skilled person in the art which lie within the scope of the present subject matter.

For example, while the previous embodiments have been described in relation to pixels of an image and their corresponding pixel values, it will be appreciated that within the context of the subject matter a group of pixels may be considered together with a corresponding group pixel value. A sample may thus correspond to one or more pixels of an image.

Many further modifications and variations will suggest themselves to those versed in the art upon making reference to the foregoing illustrative embodiments, which are given by way of example only and which are not intended to limit the scope of the subject matter, that being determined solely by the appended claims. In particular the different features from different embodiments may be interchanged, where appropriate.

In the claims, the word "comprising" does not exclude other elements or aspects, and the indefinite article "a" or "an" does not exclude a plurality. The mere fact that different features are recited in mutually different dependent claims does not indicate that a combination of these features cannot be advantageously used.

The invention claimed is:

1. A method of processing samples of an image, each sample having a respective sample value, the method comprising:
   repartition of each of the samples into a plurality of index classes, wherein the index class allocated to each sample is determined:
      depending upon the sample value of the sample with respect to the sample values of first neighbouring samples of said sample according to a given direction and further,
      depending upon the sample values of the first neighbouring samples with respect to the sample values of samples neighbouring the first neighbouring samples according to the given direction; and
   processing each sample according to the respective allocated index class, said processing including associating, with each determined index class, a respective compensation offset for application to the respective sample value of each sample of the index class;
   wherein the index class allocated to a sample is determined in dependence upon a value representative of the third derivative of the image signal at the position of the sample in the image,
   wherein the method of processing samples of the image improves encoding efficiency of an image of a sequence of images by a computer processing unit.

2. A method of processing samples of an image, each sample having a respective sample value, the method comprising:
   repartition of each of the samples into a plurality of index classes, wherein the index class allocated to each sample is determined:
      in dependence upon the sample value of the sample with respect to the sample values of first neighbouring samples of said sample according to a given direction and further,
      in dependence upon the sample values of the first neighbouring samples with respect to the sample values of samples neighbouring the first neighbouring samples according to the given direction; and
   processing each sample according to the respective allocated index class, said processing including applying compensation offsets to the sample values of the samples, each compression offset being associated with a respective index class of samples and generating a bitstream of encoded samples,
   wherein the index class allocated to a sample is determined in dependence upon a value representative of the third derivative of the image signal at the position of the sample in the image,
   wherein the method of processing samples of the image improves encoding efficiency of an image of a sequence of images by a computer processing unit.

3. The method according to claim 1, wherein the index class allocated to a sample is determined in dependence upon the sign of a value representative of the derivative of the second derivative of the image signal at the position of the sample in the image.

4. The method according to claim 1, wherein the index class CL allocated to each sample is determined based on the following equation:

$$\text{sign}[((2c-c_n1-c_n2+2)/4)-((2c_n2-c-c_n4+2)/4)]-\text{sign}[((2c_n1-c_n3-c+2)/4)-((2c-c_n1-c_n2+2)/4)]+2$$

where:
c is the sample value of the sample
$c_n1$ is the sample value of a first sample neighbouring the sample according to the given direction
$c_n2$ is the sample value of a second sample neighbouring the sample according to the given direction
$c_n3$ is the sample value of a third sample neighbouring the first sample according to the given direction
$c_n4$ is the sample value of a fourth sample neighbouring the second sample according to the given direction
sign[.] is a function defined as
   sign[x]=1, when x>0
   sign[x]=−1, when x<0
   sign[x]=0, when x=0.

5. The method according to claim 2, wherein the value representative of the second derivative and third derivative is obtained by an operation on samples corresponding to a high pass filtering.

6. The method according to claim 3, wherein the second derivative is obtained by performing a convolution product of the matrix of the current sample and its neighbouring samples with a predetermined matrix.

7. The method according to claim 3, wherein the index class CL allocated to each sample is determined based on the following equation:

$$\text{sign}[((4c-c_n1-c_n2-c'-c''+4)/8)-((4c_n2-c-c_n4-c'_n2-c''_n2+4)/8)]-\text{sign}[((4c_n1-c_n3-c-c'_n1-c''_n1+4)/8)-((4c-c_n1-c_n2-c'-c''+4)/8)]+2$$

where:
c is the sample value of the sample
$c_n1$ is the sample value of a first sample neighbouring the sample according to the given direction
$c_n2$ is the sample value of a second sample neighbouring the sample according to the given direction
$c_n3$ is the sample value of a third sample neighbouring the first sample according to the given direction
$c_n4$ is the sample value of a fourth sample neighbouring the second sample according to the given direction
c' is the sample value of a fifth sample neighboring the sample according to a direction perpendicular to the given direction
c'' is the sample value of a sixth sample neighboring the sample according to a direction perpendicular to the given direction
$c'_n1$ is the sample value of a seventh sample neighboring the first neighbouring sample of the sample according to a direction perpendicular to the given direction $c''_n1$ is the sample value of an eighth sample neighboring the first neighbouring sample of the sample according to a direction perpendicular to the given direction $c'_n2$ is the sample value of a ninth sample neighboring the second neighbouring sample of the sample according to a direction perpendicular to the given direction $c''_n2$ is the sample value of a tenth sample neighboring the second neighbouring sample of the sample according to a direction perpendicular to the given direction sign[.] is a function defined as
  sign[x]=1, when x>0
  sign[x]=−1, when x<0
  sign[x]=0, when x=0.

8. The method according to claim 3, wherein the index class CL allocated to each sample is determined based on the following equation:

$$\text{sign}[((8c-c_n1-c'_n1-c''_n1-c_n2-c'_n2-c''_n2-c'-c''+8)/16)-((8c_n2-c-c'-c''-c_n4-c'_n4-c''_n4-c'_n2-c''_n2+8)/16)]-\text{sign}[((8c_n1-c_n3-c'_n3-c''_n3-c-c'c''-c'_n1-c''_n1+8)/16)-((4c-c_n1-c'_n1-c''_n1-c_n2-c'_n2-c''_n2-c'-c''+8)/16)]+2$$

where:
c is the sample value of the sample
$c_n1$ is the sample value of a first sample neighbouring the sample according to the given direction
$c_n2$ is the sample value of a second sample neighbouring the sample according to the given direction
$c_n3$ is the sample value of a third sample neighbouring the first sample according to the given direction
$c_n4$ is the sample value of a fourth sample neighbouring the second sample according to the given direction
c' is the sample value of a fifth sample neighboring the sample according to a direction perpendicular to the given direction
c'' is the sample value of a sixth sample neighboring the sample according to a direction perpendicular to the given direction
$c'_n1$ is the sample value of a seventh sample neighboring the first neighbouring sample of the sample according to a direction perpendicular to the given direction
$c''_n1$ is the sample value of an eighth sample neighboring the first neighbouring sample of the sample according to a direction perpendicular to the given direction
$c'_n2$ is the sample value of a ninth sample neighboring the second neighbouring sample of the sample according to a direction perpendicular to the given direction
$c''_n2$ is the sample value of a tenth sample neighboring the second neighbouring sample of the sample according to a direction perpendicular to the given direction
$c'_n3$ is the sample value of an eleventh sample neighboring the third neighbouring sample of the sample according to a direction perpendicular to the given direction
$c''_n3$ is the sample value of a twelfth sample neighboring the third neighbouring sample of the sample according to a direction perpendicular to the given direction
$c'_n4$ is the sample value of a thirteenth sample neighboring the fourth neighbouring sample of the sample according to a direction perpendicular to the given direction
$c''_n4$ is the sample value of a fourteenth sample neighboring the fourth neighbouring sample of the sample according to a direction perpendicular to the given direction
sign[.] is a function defined as
  sign[x]=1, when x>0
  sign[x]=−1, when x<0
  sign[x]=0, when x=0.

9. The method according to claim 2, further comprising:
performing initial encoding on the samples;
decoding the encoded samples to provide reconstructed samples;
performing loop filtering on the reconstructed samples wherein the loop filtering comprises applying compensation offsets.

10. The method according to claim 2, wherein image data comprises a plurality of layers including a base layer and an enhancement layer, the method comprising:
up sampling the base layer of the image data, wherein the compensation offsets are applied to samples of the up sampled base layer.

11. The method according to claim 2, wherein applying compensation offsets may be performed on the same sample more than once.

12. The method according to claim 2, further comprising transmitting, in the bitstream, encoded data representative of the respective compensation offsets for each index class.

13. The method according to claim 2, further comprising transmitting, in the bitstream, encoded classification data defining a selected classification direction.

14. A method of decoding an image composed of a plurality of samples, the method comprising:
classifying the samples into a plurality of index classes in accordance with the processing method of claim 1;
applying compensation offsets to the sample values of the samples, each compensation offset being associated with a respective index class of sample.

15. The method according to claim 14, further comprising:
receiving encoded samples;
decoding the encoded samples to provide reconstructed samples;
performing loop filtering on the reconstructed samples wherein the loop filtering comprises applying compensation offsets.

16. The method according to claim 14, wherein image data comprises a plurality of layers including a base layer and an enhancement layer, the method further comprising:
up sampling the base layer of the image data, wherein the compensation offsets are applied to samples of the up sampled base layer.

17. The method according to claim 14, wherein applying compensation offsets may be performed on the same sample more than once.

18. A method of decoding an image composed of a plurality of sample values, the method comprising:
receiving encoded sample values;
receiving encoded classification data defining a selected classification direction associated with respective compensation offsets provided according to the method of claim 1, each compensation offset corresponding to an index class of samples;
decoding the encoded samples to provide reconstructed samples and decoding the encoded compensation offsets; and
performing loop filtering on the reconstructed samples, the loop filtering comprising applying the received compensation offsets to the image samples of the respective samples, according to the index class of the sample.

19. A non-transitory computer-readable storage medium storing instructions of a computer program for implementing a method, according to claim 1, when the computer program is loaded and executed by a computer system.

20. A device for processing samples of an image, each sample having a respective sample value the device comprising:
- a repartition module for dividing the samples into a plurality of index classes, wherein the index class allocated to each sample is determined:
  - depending upon the sample value of the sample with respect to the sample values of first neighbouring samples of said sample according to a given direction and further,
  - depending upon the sample values of the first neighbouring samples with respect to the sample values of samples neighbouring the first neighbouring samples according to the given direction; and
- a computer processing unit for processing each sample according to the respective allocated index class,
- wherein the computer processing unit is configured to associate, with each determined index class, a respective compensation offset for application to the respective sample value of each sample of the index class,
- wherein the index class allocated to a sample is determined in dependence upon a value representative of the third derivative of the image signal at the position of the sample in the image,
- wherein the computer processing unit for processing samples of the image improves encoding efficiency of an image of a sequence of images.

21. A device for processing samples of an image, each sample having a respective sample value, the device comprising:
- a repartition module for dividing the samples into a plurality of index classes, wherein the index class allocated to each sample is determined:
  - depending upon the sample value of the sample with respect to the sample values of first neighbouring samples of said sample according to a given direction and further
  - depending upon the sample values of the first neighbouring samples with respect to the sample values of samples neighbouring the first neighbouring samples according to the given direction; and
- a computer processing unit for processing each sample according to the respective allocated index class, wherein the computer processing unit further comprises:
- a compensation offset module for applying compensation offsets to the sample values of the samples, each compensation offset being associated with a respective index class of samples; and
- an encoder for generating a bitstream of encoded samples,
- wherein the index class allocated to a sample is determined in dependence upon a value representative of the third derivative of the image signal at the position of the sample in the image,
- wherein the computer processing unit for processing samples of the image improves encoding efficiency of an image of a sequence of images.

22. A device for decoding an image composed of a plurality of samples, the device comprising:
- a device for processing the samples into a plurality of index classes in accordance with the device of claim 20,
- a compensation offset module for applying compensation offsets to the sample values of the samples, each compensation offset being associated with a respective index class of samples.

23. A device of decoding an image composed of a plurality of sample values, the device comprising:
- a receiver for receiving encoded sample values and encoded classification data defining a selected classification direction associated with respective compensation offsets provided according to the device of claim 22, each compensation offset corresponding to an index class of samples;
- a decoder for decoding the encoded samples to provide reconstructed samples and decoding the encoded compensation offsets; and
- a loop filter for performing loop filtering on the reconstructed samples, the loop filtering comprising applying the received compensation offsets to the image samples of the respective samples, according to the index class of the sample.

* * * * *